United States Patent
Tsutsui et al.

(10) Patent No.: US 8,933,137 B2
(45) Date of Patent: Jan. 13, 2015

(54) FOAMABLE COMPOSITE RESIN PARTICLE FOR FROZEN STORAGE

(75) Inventors: Yasutaka Tsutsui, Shiga (JP); Masahiko Ozawa, Shiga (JP)

(73) Assignee: Sekisui Plastics Co., Ltd., Osaka (JP)

(*) Notice: Subject to any disclaimer, the term of this patent is extended or adjusted under 35 U.S.C. 154(b) by 156 days.

(21) Appl. No.: 13/637,663

(22) PCT Filed: Jan. 24, 2011

(86) PCT No.: PCT/JP2011/051231
§ 371 (c)(1),
(2), (4) Date: Nov. 28, 2012

(87) PCT Pub. No.: WO2011/122081
PCT Pub. Date: Oct. 6, 2011

(65) Prior Publication Data
US 2013/0065977 A1 Mar. 14, 2013

(30) Foreign Application Priority Data
Mar. 30, 2010 (JP) ................. 2010-078761

(51) Int. Cl.
*C08J 9/16* (2006.01)
*C08J 9/18* (2006.01)
*C08J 9/14* (2006.01)
*C08J 9/00* (2006.01)

(52) U.S. Cl.
CPC ............... *C08J 9/141* (2013.01); *C08J 9/0061* (2013.01); *C08J 9/18* (2013.01); *C08J 2203/14* (2013.01); *C08J 2323/06* (2013.01); *C08J 2325/06* (2013.01); *C08J 2423/12* (2013.01)

USPC ................. 521/56; 521/59; 521/60; 521/134; 521/142; 521/143; 521/149

(58) Field of Classification Search
USPC ........ 521/59, 56, 60, 134, 142, 143, 144, 149
See application file for complete search history.

(56) References Cited

U.S. PATENT DOCUMENTS

| 5,086,079 A | 2/1992 | Reese et al. |
| 7,294,655 B2 * | 11/2007 | Tang et al. ..................... 521/57 |
| 2010/0022674 A1 | 1/2010 | Morioka et al. |

FOREIGN PATENT DOCUMENTS

| JP | 61-171746 | * | 8/1986 |
| JP | 62-011740 | | 1/1987 |
| JP | Hei. 04-031449 A | | 2/1992 |
| JP | 6-104746 | | 12/1994 |
| JP | 7-91405 | | 10/1995 |
| JP | 2004-244529 A | | 9/2004 |
| JP | 2008-133449 | | 6/2008 |
| WO | WO 2008050909 A1 | * | 5/2008 |

OTHER PUBLICATIONS

Search report from International Application No. PCT/JP2011/051231, mail date is Feb. 22, 2011.

* cited by examiner

*Primary Examiner* — Kara Boyle
(74) *Attorney, Agent, or Firm* — Greenblum & Bernstein, P.L.C.

(57) ABSTRACT

Expandable composite resin particles for frozen storage comprising: composite resin particles of a polyolefin-based resin and a polystyrene-based resin; 7.5 to 11% by weight of volatile blowing agent contained in the composite resin particles and containing pentane; and 0.5 to 1.5% by weight of moisture attached to surfaces of the composite resin particles.

11 Claims, No Drawings

FOAMABLE COMPOSITE RESIN PARTICLE FOR FROZEN STORAGE

TECHNICAL FIELD

The present invention relates to foamable (expandable) composite resin particles for frozen storage, a method for producing the same, a method for storing the same, frozen-stored expandable composite resin particles and an expanded molded article. More specifically, the present invention relates to expandable composite resin particles for frozen storage, which contain pentane in composite resin particles of a polyolefin-based resin and a polystyrene-based resin, and have a moisture attached to surfaces of the composite resin particles, a method for producing the same, a method for storing the same, frozen-stored expandable composite resin particles and an expanded molded article.

BACKGROUND ART

Generally, expandable particles of a composite resin of a polyolefin-based resin and a polystyrene-based resin (also referred to simply as expandable composite resin particles) is obtained by impregnating composite resin particles (also referred to simply as resin particles) with a volatile blowing agent. In addition, it is known that a moisture is included in expandable composite resin particles for improving moldability of an expanded molded article and the like (see, for example, Japanese Examined Patent Publication No. Hei 6-104746: Patent Document 1 and Japanese Examined Patent Publication No. Hei 7-91405: Patent Document 2).

Moisture contents of the expandable composite resin particles described in Patent Documents 1 and 2 are 0.5 to 1.5% by weight, and the volatile blowing agent used in Examples is butane.

PRIOR ART DOCUMENTS

Patent Documents

Patent Document 1: Japanese Examined Patent Publication No. Hei 6-104746
Patent Document 2: Japanese Examined Patent Publication No. Hei 7-91405

SUMMARY OF THE INVENTION

Problems to be Solved by the Invention

In recent years, a site for producing expandable composite resin particles has been often different from a site for expanding the obtained expandable composite resin particles. If the sites are different, it is necessary to transport expandable composite resin particles, but for transporting expandable composite resin particles containing butane that is normally used as an easily volatile blowing agent, they should be transported with a loss of butane minimized to retain an expanding capability of expandable composite resin particles. Transportation means that is generally used is transportation in a frozen state. In the case of butane-containing expandable composite resin particles, even though the particles are sufficiently cooled by frozen storage at, for example, about −15° C. and then transported in a frozen state, it is necessary to use a pressure-resistance container in terms of safety if considering subsequent pre-expansion at ordinary temperature. Thus, there is a problem that expandable composite resin particles cannot be transported in large quantities, so that transportation itself is expensive.

On the other hand, in case where pentane that is liquid at ordinary temperature is used as a blowing agent to produce expandable composite resin particles and the produced particles are froze, an expanding capability of expandable composite resin particles can be secured to some extent in a sealable container (including a bag-shaped container) even if a pressure-resistance container is not used.

Incidentally, frozen expandable composite resin particles are taken out from the sealable container before pre-expansion. Dissipation of the blowing agent starts at this time. Expandable composite resin particles should retain a predetermined expanding capability after being taken out from the container and before being subjected to pre-expansion. An amount of expandable composite resin particles capable of retaining the expanding capability is a one-packing unit.

Specifically, provided that 10 kg of expandable composite resin particles are used per pre-expansion and pre-expansion time is 5 minutes, the one-packing unit can be set to 20 kg if expanding capability retaining time is 10 minutes. If the one-packing unit decreases, production efficiency is reduced, and costs of packing materials are increased. In addition, efficiency in storage and transportation of a large number of packing units is reduced, and there are considerable operational man-hours required for operations of filling expandable composite resin particles and unsealing operations during expansion. Therefore, a small amount of one-packing unit is not economical. Accordingly, for increasing the one-packing unit as much as possible, it is desired to suppress dissipation of the blowing agent from expandable composite resin particles in an open state (in other words, increase expanding capability retaining time).

Solutions to the Problems

Thus, according to the present invention, there are provided expandable composite resin particles for frozen storage comprising: composite resin particles of a polyolefin-based resin and a polystyrene-based resin; 7.5 to 11% by weight of volatile blowing agent contained in the composite resin particles and containing pentane; and 0.5 to 1.5% by weight of moisture attached to surfaces of the composite resin particles.

In addition, according to the present invention, there are provided expanded molded article obtained by pre-expanding the expandable composite resin particles for frozen storage and then molding the pre-expanded particles in a mold.

Further, according to the present invention, there is provided a method for producing the expandable composite resin particles for frozen storage, comprising steps of: impregnating composite resin particles with a volatile blowing agent containing pentane; and moisturizing or dewatering the composite resin particles after impregnation to adjust an amount of attached moisture on surfaces.

In addition, according to the present invention, there is provided a method for storing expandable composite resin particles for frozen storage, comprising a step of storing the expandable composite resin particles for frozen storage in a container set at −5° C. or lower until the particles are subjected to a pre-expansion step.

Further, according to the present invention, there are provided frozen-stored expandable composite resin particles, comprising: composite resin particles of a polyolefin-based resin and a polystyrene-based resin; 7.5 to 11% by weight of volatile blowing agent contained in the composite resin particles and containing pentane; and 0.5 to 1.5% by weight of moisture attached to surfaces of the composite resin particles, wherein the particles are stored in a container set at −5° C. or lower.

Effects of the Invention

According to expandable composite resin particles for frozen storage according to the present invention, expanding capability retaining time after frozen storage can be increased while keeping satisfactory working properties during pre-expansion by having predetermined amounts of surface-attached moisture and volatile blowing agent.

Further, when the composite resin particles are particles containing 100 parts by weight of polyethylene-based resin or polypropylene-based resin as a polyolefin-based resin and 110 to 900 parts by weight of polystyrene-based resin, expanding capability retaining time after frozen storage can be increased while keeping satisfactory working properties during pre-expansion, and there can be provided expandable composite resin particles capable of giving an expanded molded article, whose anti-cracking property is improved.

In addition, when the composite resin particles are particles containing 100 parts by weight of polyethylene-based resin or polypropylene-based resin as a polyolefin-based resin and 110 to 730 parts by weight of polystyrene-based resin, expanding capability retaining time after frozen storage can be increased while keeping satisfactory working properties during pre-expansion, and there can be provided expandable composite resin particles capable of giving an expanded molded article, whose anti-cracking property is improved.

Further, when the expandable composite resin particles for frozen storage further contain 0.05 to 0.5% by weight of internal moisture, expanding capability retaining time after frozen storage can be increased while keeping satisfactory working properties during pre-expansion, and there can be provided expandable composite resin particles capable of giving an expanded molded article, of which cell unevenness is suppressed.

In addition, when pentane is contained in an mount of 8.5 to 10.0% by weight, a size of cells in pre-expanded particles can be adjusted to a more optimum range while keeping satisfactory working properties during pre-expansion to thereby provide expandable composite resin particles capable of giving an expanded molded article, whose moldability and anti-cracking property are compatible at a high level.

Further, when expandable composite resin particles for frozen storage further contain 0.01 to 0.1% by weight of moisturizing agent attached to surfaces thereof, expanding capability retaining time after frozen storage can be further increased while keeping satisfactory working properties during pre-expansion.

In addition, when the moisturizing agent is a polyethylene glycol having a weight average molecular weight of 100 to 600, expanding capability retaining time after frozen storage can be further increased while keeping satisfactory working properties during pre-expansion.

Further, according to a method for producing expandable composite resin particles for frozen storage according to the present invention, expandable composite resin particles for frozen storage having the above-mentioned effects can conveniently be produced.

In addition, according to a method for storing expandable composite resin particles for frozen storage according to the present invention, expandable composite resin particles for frozen storage having the above-mentioned effects can conveniently be stored.

Further, expandable composite resin particles for frozen storage according to the present invention are particles having satisfactory working properties during pre-expansion and long expanding capability retaining time after frozen storage.

MODE FOR CARRYING OUT THE INVENTION

Expandable composite resin particles have generally been dried to remove a moisture attached to their surfaces after production thereof. A reason for this is that when expandable composite resin particles are frozen and stored, a moisture attached to their surfaces causes particles to be bound together, so that an operation is required to loosen bound particles before pre-expansion. Therefore, it has been considered preferable to ensure that no moisture is present wherever possible. The inventors of the present invention have found that if an amount of attached moisture on the surface is in a specific range, binding of particles can be prevented, and surprisingly expanding capability retaining time can be increased, resulting in the present invention.

Expandable composite resin particles for frozen storage (hereinafter, also referred to simply as expandable composite resin particles) according to the present invention have a predetermined range of amounts of attached moisture on surfaces of composite resin particles of a polyolefin-based resin and a polystyrene-based resin, and a predetermined range of contents of a volatile blowing agent (hereinafter, also referred to simply as blowing agent) in the composite resin particles.

(Amount of Surface-Attached Moisture)

An amount of moisture attached to surfaces of expandable composite resin particles is in a range of 0.5 to 1.5% by weight. If the amount is less than 0.5% by weight, an effect of suppressing dissipation of the blowing agent from expandable composite resin particles is not sufficient, and thus expanding capability retaining time cannot be increased. If the amount is more than 1.5% by weight, expandable composite resin particles are strongly bound together, so that it arises considerable inconvenience in terms of operations such as difficulty of suction of expandable composite resin particles into an expansion machine. A preferable amount of moisture is 0.6 to 1.2% by weight. For example, the amount of moisture can be set to 0.7% by weight, 0.8% by weight, 0.9% by weight, 1.0% by weight or 1.1% by weight. The amount of moisture attached to surfaces can be calculated by measuring the total moisture amount and the amount of moisture within particles by a Karl Fischer's method and subtracting the latter from the former. A detailed calculation method will be described in a section of Examples.

Adjustment of the amount of moisture is not particularly limited, and mention is made of a known moisturization method (for example, spraying method, dipping method, etc.) or dewatering method (for example, heating method, centrifugal separation method, method of retaining under reduced pressure, etc.). Specifically, if impregnation with the blowing agent is performed in a wet process, the amount of moisture can be adjusted by processing the particles in a centrifugal separator for a minute or longer. In the case of a dry process, the amount of moisture can be adjusted by adding a moisture corresponding to a desired amount of moisture at the time of impregnation with the blowing agent.

(Content of Volatile Blowing Agent)

A content of the blowing agent contained in expandable composite resin particles is in a range of 7.5 to 11% by weight. If the content of the blowing agent is less than 7.5% by weight, an expanding property of expandable composite resin particles may be degraded. If the expanding property is degraded, pre-expanded particles having a high bulk expansion ratio and a low bulk density become difficult to obtain, and an expanded molded article obtained by molding the pre-expanded particles in a mold may have a reduced fusion rate and hence a degraded anti-cracking property. On the other hand, if the content of the blowing agent is more than 11.0% by weight, a size of cells in pre-expanded particles easily becomes excessively large, so that a degradation in moldability and a reduction in strength properties such as compression strength and bending strength of the obtained expanded molded article may occur. A more preferable content of the blowing agent is in a range of 8.5 to 10.0% by weight. For example, the content of the blowing agent can be set to 8.7% by weight, 8.9% by weight, 9.1% by weight, 9.3% by weight, 9.5% by weight, 9.7% by weight or 9.9% by weight.

The blowing agent preferably contains pentane as a main component (in an amount, for example, 50% by weight or more). Here, pentane refers to chain pentane, and can be selected from, for example, i-pentane, n-pentane and mixtures thereof. Particularly, it is preferable to use pentane containing i-pentane and n-pentane at a ratio of 20:80 to 100:0. Blowing agents other than pentane include hydrocarbons such as propane, n-butane, isobutane, cyclopentane and hexane.

Expandable composite resin particles containing a predetermined amount of blowing agent are obtained by a method of impregnating composite resin particles with a blowing agent in an aqueous medium (wet impregnation method) or a method of impregnating composite resin particles with a blowing agent in the absence of a medium (dry impregnation method).

(Amount of Internal Moisture)

Expandable composite resin particles preferably have 0.05 to 0.5% by weight of internal moisture. If an amount of internal moisture is less than 0.05% by weight, cells on surfaces of and within pre-expanded particles tends to become very small, leading to an increase in cell unevenness. If the amount of internal moisture is more than 0.5% by weight, cells on surfaces of and within pre-expanded particles may become very large, leading to deterioration of an exterior appearance of an expanded molded article. A preferable amount of moisture is 0.1 to 0.45% by weight. For example, the amount of moisture can be set to 0.15% by weight, 0.2% by weight, 0.25% by weight, 0.3% by weight or 0.35% by weight.

A method for adjusting the amount of internal moisture is not particularly limited, and the amount can be adjusted by a known method. Mention is made of, for example, (i) a method of contacting composite resin particles before being impregnated with a blowing agent with a moisture, or drying the particles; (ii) a method of contacting expandable composite resin particles with a moisture, or drying the particles; (iii) a method of carrying out the above-mentioned two methods at the same time; and the like. Among them, method (iii) is preferable because adjustment of the surface-attached moisture amount is performed by a method of contacting a moisture with expandable composite resin particles. "Contacting expandable composite resin particles with a moisture" in method (ii) also includes a case where impregnation with a blowing agent is carried out in an aqueous medium.

In composite resin particles in method (iii), for example, if the amount of internal moisture is low, an internal moisture can be added to composite resin particles by dispersing composite resin particles in an aqueous medium, and holding the medium at 110 to 140° C. for 2 to 5 hours in a sealed state. It is preferable to add a dispersant to the aqueous medium beforehand. If the amount of internal moisture is high, the amount of moisture can be decreased by drying composite resin particles in a dryer. For example, in the case of a batch type flash dryer, the amount of moisture can be decreased to a predetermined amount by passing air preferably at 10 to 70° C., more preferably at 20 to 60° C. for 0.5 to 3 hours. The amount of internal moisture may also be adjusted by including a large amount of moisture in composite resin particles, followed by drying the particles in a dryer. The amount of internal moisture may also be adjusted by placing composite resin particles for a fixed time period in an atmosphere where a temperature and a humidity are controlled to a constant level. The amount of internal moisture of composite resin particles is preferably adjusted to a range of 0.05 to 0.5% by weight. For example, the amount of moisture can be set to 0.1% by weight, 0.15% by weight, 0.2% by weight, 0.25% by weight, 0.3% by weight, 0.35% by weight, 0.4% by weight or 0.45% by weight.

Further, if composite resin particles are produced in large quantities, composite resin particles containing a predetermined internal moisture are obtained by adjusting an air temperature at pneumatic transportation (called a pneumatic temperature) and a flow rate when composite resin particles are pneumatically transported. The amount of internal moisture can be simply adjusted to a predetermined amount by, for example, transporting composite resin particles at a pneumatic temperature of preferably 10 to 70° C., more preferably 20 to 60° C. and at a flow rate of preferably 5 to 30 m/sec, more preferably 10 to 20 m/sec. The amount of internal moisture may be more than 0.5% by weight when the pneumatic temperature is lower than 10° C., and the amount of internal moisture may be less than 0.05% by weight when the pneumatic temperature is higher than 70° C. On the other hand, when the flow rate is less than 5 m/sec, transportation of composite resin particles in a vertical direction may be difficult, or the amount of internal moisture may be less than 0.05% by weight. When the flow rate is more than 30 m/sec, it may be required to increase a size of a blower, thus being uneconomical although not inconvenient, or the amount of internal moisture may be more than 0.5% by weight.

In this way, expandable composite resin particles containing a predetermined amount of pentane can be obtained by impregnating composite resin particles, whose amount of internal moisture is adjusted to a predetermined amount, with a predetermined amount of pentane by a wet impregnation method or a dry impregnation method. Here, adjustment of the amount of surface-attached moisture is performed during or after impregnation with the blowing agent, and therefore the amount of internal moisture may also be changed at this time. Thus, in method (iii), it is preferable to adjust the amount of surface-attached moisture and the amount of internal moisture at the same time.

(Moisturizing Agent)

0.01 to 0.1% by weight of a moisturizing agent may be further attached to surfaces of expandable composite resin particles. By attaching the moisturizing agent, evaporation of a moisture attached to surfaces of expandable composite resin particles can be prevented for a longer period. If an attached amount of the moisturizing agent is less than 0.01% by weight, an effect of preventing evaporation of a moisture may not be sufficient. If the attached amount of moisturizing agent is more than 0.1% by weight, expandable composite resin particles may become sticky to cause inconvenience in terms of operations during expansion. A more preferable attached amount of moisturizing agent is 0.02 to 0.08% by weight. For example, the amount of moisturizing agent can be set to 0.03% by weight, 0.04% by weight, 0.05% by weight, 0.06% by weight or 0.07% by weight.

The moisturizing agent is not particularly limited as long as expansion is not adversely influenced. Mention is made of, for example, polyethylene glycol, polyoxyethylene alkylphenol ether, monoglyceride stearate and the like. Among them, a polyethylene glycol having a weight average molecular weight of 100 to 600 is preferable.

(Composite Resin Particle)

(1) Polyolefin-Based Resin

The polyolefin-based resin is not particularly limited, and a known resin can be used. In addition, the polyolefin-based resin may be crosslinked. Mention is made of, for example, polyethylene-based resins such as branched low-density polyethylene, linear low-density polyethylene, medium-density polyethylene, high-density polyethylene, ethylene-vinyl acetate copolymers, ethylene-methyl methacryrate copolymers and crosslinked products of these polymers; and polypropylene-based resins such as propylene homopolymers, ethylene-propylene random copolymers, propylene-1-butene copolymers and ethylene-propylene-butene random copolymers. In the examples described above, the low density is preferably 0.91 to 0.94 g/cm$^3$, more preferably 0.91 to 0.93 g/cm$^3$. The high density is preferably 0.95 to 0.97 g/cm$^3$, more preferably 0.95 to 0.96 g/cm$^3$. The medium density is a density at a midpoint between the low density and the high density.

(2) Polystyrene-Based Resin

The polystyrene-based resin is polystyrene, or a copolymer of styrene and other monomers being capable of copolymerization with styrene and having styrene as a main component. The main component means that styrene constitutes 70% by weight or more of all monomers. Examples of other monomers include α-methylstyrene, p-methylstyrene, acrylonitrile, methacrylonitrile, acrylic acid, methacrylic acid, alkyl acrylate, alkyl methacrylate, divinyl benzene and polyethylene glycol dimethacrylate. In the examples, the alkyl means an alkyl having 1 to 8 carbon atoms.

(3) Ratio of Polystyrene-Based Resin and Polyolefin-Based Resin

The polystyrene-based resin is preferably contained in expandable composite resin particles in an amount of 110 to 900 parts by weight based on 100 parts by weight polyolefin-based resin particles. A ratio of both resins almost corresponds to a ratio of both corresponding monomers for producing expandable composite resin particles.

If a content of the polystyrene-based resin is more than 900 parts by weight, an anti-cracking property may be degraded. On the other hand, if the content of the polystyrene-based resin is less than 110 parts by weight, the anti-cracking property of the expanded molded article is considerably improved, but dissipation of the blowing agent from surfaces of the expandable composite resin particles tends to be accelerated. Thus, an expandable period (beads life) of expandable composite resin particles may become shorter due to degradation of retainability of the blowing agent. A more preferable content of the polystyrene-based resin is 110 to 730 parts by weight, a further preferable content is 120 to 560 parts by weight, and an especially preferable content is 140 to 450 parts by weight.

(4) Method for Producing Composite Resin Particles

The composite resin of a polyolefin-based resin and a polystyrene-based resin means a mixed resin of polyolefin-based resin and a polystyrene-based resin. For the mixed resin, a resin obtained by simply mixing both resins can be used, but a polyolefin-modified styrene-based resin as described later is preferable. A more preferable mixed resin is a polyethylene-modified styrene-based resin.

Particles of the polyolefin-modified styrene-based resin (also referred to as modified resin particles) are obtained by adding a styrene-based monomer to an aqueous medium in which polyolefin-based resin particles are dispersed and retained, and polymerizing the same. A method for producing modified resin particles will be described below.

Polyolefin-based resin particles can be obtained by a known method. For example, a polyolefin-based resin is melted and extruded using an extruder, and then formed into particles by underwater cutting, strand cutting or the like. Shapes of polyolefin-based resin particles include spherical, elliptical shape (oval), cylindrical, prismatic, pellet and granular shapes. Hereinbelow, polyolefin-based resin particles will also be described as micropellets.

Polyolefin-based resin particles may contain a radical scavenger. The radical scavenger may be added to polyolefin-based resin particles beforehand, or added concurrently with melt extrusion. The radical scavenger is a compound having an action of trapping radicals, such as a polymerization inhibitor (including a polymerization retarder), a chain transfer agent, an antioxidant, a hindered amine-based light stabilizer, and is preferably hard to be dissolved in water.

Examples of the polymerization inhibitor include phenol-based polymerization inhibitors such as t-butylhydroquinone, paramethoxyphenol, 2,4-dinitrophenol, t-butylcatechol, sec-propylcatechol, N-methyl-N-nitrosoaniline, N-nitrosophenylhydroxyamine, triphenyl phosphite, tris (nonylphenyl phosphite), triethyl phosphite, tris(2-ethylhexyl)phosphite, tridecyl phosphite, tris(tridecyl)phosphite, diphenyl mono(2-ethylhexyl)phosphite, diphenyl monodecyl phosphite, diphenyl mono(tridecyl)phosphite, dilauryl hydrogen phosphite, tetraphenyl dipropylene glycol diphosphite and tetraphenyl tetra(tridecyl)pentaerythritol tetraphosphite, nitroso-based polymerization inhibitors, aromatic amine-based polymerization inhibitors, phosphite-based polymerization inhibitors and thioether-based polymerization inhibitors.

Examples of the chain transfer agent include 2-ethylhexyl β-mercaptopropionate, dipentaerythritolhexakis (3-mercaptopropionate) and tris[(3-mercaptopropionyloxy)-ethyl]isocyanurate.

Examples of the antioxidant may include phenol-based antioxidants such as 2,6-di-t-butyl-4-methylphenol (BHT), n-octadecyl-3-(3,5-di-t-butyl-4-hydroxyphenyl) propionate, pentaerythrityl-tetrakis[3-(3,5-di-t-butyl-4-hydroxyphenyl) propionate], 1,3,5-tris(3,5-di-tert-butyl-4-hydroxybenzyl) isocyanurate, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5.5]undecane, distearyl pentaerythritol diphosphite, tris(2,4-di-t-butylphenyl)phosphite, bis(2,4-di-t-butylphenyl)pentaerythritol diphosphite, tetrakis(2,4-di-t-butylphenyl)4,4'-biphenylene diphosphonite, bis(2-t-butyl-4-methylphenyl)pentaerythritol diphosphite, 2,4,8,10-tetra-t-butyl-6-[3-(3-methyl-4-hydroxy-5-t-butylphenyl)propoxy] dibenzo[d,f][1,3,2]dioxaphosphepine, phenyl-1-naphthylamine, octylated diphenylamine, 4,4-bis(α,α-dimethylbenzyl)diphenylamine and N,N'-di-2-naphthyl-p-phenylenediamine, phosphorus-based antioxidants, and amine-based antioxidants.

Examples of the hindered amine-based light stabilizers may include bis(2,2,6,6-tetramethyl-4-piperidyl)sebacate, bis(1,2,2,6,6-pentamethyl-4-piperidyl)sebacate and bis(1,2, 2,6,6-pentamethyl-4-piperidyl)-2-(3,5-di-t-butyl-4-hydroxybenzyl)-2-n-butyl malonate.

An amount of radical scavenger used is preferably 0.005 to 0.5 parts by weight based on 100 parts by weight of polyolefin-based resin particles.

Polyolefin-based resin particles may further contain a blowing nucleating agent such as talc, calcium silicate, calcium stearate, synthetic or naturally occurring silicon dioxide, ethylenebisstearic acid amide or a methacrylate-based copolymer, a fire retardant such as hexabromocyclododecane or a triallyl isocyanurate hexabromide, a colorant such as carbon black, iron oxide or graphite, and the like.

Next, micropellets are dispersed in an aqueous medium in a polymerization container, and polymerized while impregnating the micropellets with a styrene-based monomer.

Examples of the aqueous media include water, and a mixed medium of water and a water-soluble solvent (e.g. alcohol).

For the styrene-based monomer, either styrene or substituted styrene (substituents include a lower alkyl, a halogen atom (particularly chlorine atom)) can be used. Examples of substituted styrene include a chlorostyrene, a vinyl toluene such as p-methylstyrene, and α-methylstyrene. Among them, styrene is generally preferable. For the styrene-based monomer, a mixture of styrene and substituted styrene, or a mixture of styrene and a small amount of other monomers capable of being copolymerized therewith (for example, acrylonitrile, alkyl methacrylate (the number of carbon atoms of an alkyl moiety is about 1 to 8), mono or dialkyl maleate (the number of carbon atoms of an alkyl moiety is about 1 to 4), divinyl benzene, ethylene glycol mono or diacrylate or methacrylate, maleic anhydride, N-phenylmaleimide and the like) can be used. In these mixtures, styrene is preferably present in a predominant proportion (for example 50% by weight or more).

A solvent (plasticizer) such as toluene, xylene, cyclohexane, ethyl acetate, dioctyl phthalate or tetrachloroethylene may be added to the styrene-based monomer.

An amount of styrene-based monomer used is 110 to 900 parts by weight based on 100 parts by weight of polyolefin-based resin particles. The amount of styrene-based monomer used is more preferably 110 to 730 parts by weight, further preferably 120 to 560 parts by weight, especially preferably 140 to 450 parts by weight.

If the amount of styrene-based monomer used is more than 730 parts by weight, particles of a polystyrene-based resin alone may be generated as polyolefin-based resin particles are not impregnated with the monomer. In addition, not only the anti-cracking property of the expanded molded article but also a chemical resistance may be degraded. On the other hand, if the amount of styrene-based monomer used is less than 110 parts by weight, a capability of expandable composite resin particles retaining the blowing agent may be reduced. If the capability is reduced, enhancement of expansion becomes difficult. In addition, stiffness of the expanded molded article may be degraded.

Impregnation of polyolefin-based resin particles with the styrene-based monomer may be performed while polymerization is carried out or before polymerization is started. Among them, it is preferable to perform impregnation while carrying out polymerization. If polymerization is carried out after impregnation, the styrene-based monomer is easily polymerized in the vicinity of surfaces of polyolefin-based resin particles, and a styrene-based monomer not involved in impregnation of polyolefin-based resin particles may be homopolymerized to generate a large amount of fine polystyrene-based resin particles.

If impregnation is performed while carrying out polymerization, the polyolefin-based resin particle when the above-mentioned content is calculated means a particle constituted by a polyolefin-based resin, an impregnated styrene-based monomer, and further an impregnated and already polymerized polystyrene-based resin.

For keeping the content at 0 to 35% by weight, the styrene-based monomer can be continuously or intermittently added to an aqueous medium in a polymerization container. Particularly, it is preferable to gradually add the styrene-based monomer to the aqueous medium.

An oil-soluble radical polymerization initiator can be used for polymerization of the styrene-based monomer. For the polymerization initiator, a polymerization initiator that is generally used for polymerization of a styrene-based monomer can be used. Mention is made of, for example, organic peroxides such as benzoil peroxide, lauroyl peroxide, t-butyl peroxyoctoate, t-hexyl peroxyoctoate, t-butyl peroxybenzoate, t-amyl peroxybenzoate, t-butyl peroxypivarate, t-butyl peroxyisopropylcarbonate, t-hexyl peroxyisopropylcarbonate, t-butyl peroxy-3,3,5-trimethylcyclohexanoate, di-t-butyl peroxyhexahydroterephthalate, 2,2-di-t-butyl peroxybutane, di-t-hexyl peroxide and dicumyl peroxide, and azo compounds such as azobisisobutyronitrile and azobisdimethylvaleronitrile. These oil-soluble radical polymerization initiators may be used alone or in combination.

There are various methods for adding a polymerization initiator to an aqueous medium in a polymerization container. Examples include
(a) a method of dissolving and thereby including a polymerization initiator in a styrene-based monomer in a container different from a polymerization container, and feeding the styrene-based monomer into the polymerization container,
(b) a method of dissolving a polymerization initiator in a part of a styrene-based monomer, a solvent such as isoparaffin or a plasticizer to prepare a solution; and feeding the solution and a predetermined amount of styrene-based monomer into a polymerization container at the same time,
(c) a method of dispersing a polymerization initiator in an aqueous medium to prepare a dispersion liquid; and feeding the dispersion liquid and a styrene-based monomer into a polymerization container.

Preferably, a ratio of the polymerization initiator used is normally 0.02 to 2.0% by weight of a total amount of styrene-based monomer.

It is preferable to dissolve a water-soluble radical polymerization inhibitor beforehand in the aqueous medium. This is because the water-soluble radical polymerization inhibitor not only suppresses polymerization of the styrene-based monomer at surfaces of polyolefin-based resin particles, but also can prevent a styrene-based monomer suspended in the aqueous medium from being homopolymerized to reduce generation of fine particles of the polystyrene based resin.

An amount of the water-soluble radical polymerization inhibitor is preferably 0.001 to 0.04 parts by weight based on 100 parts by weight of water in the aqueous medium.

It is preferable to add a dispersant to the aqueous medium beforehand. Examples of the dispersant include organic dispersants such as partially saponified polyvinyl alcohol, polyacrylate, polyvinyl pyrrolidone, carboxymethyl cellulose and methyl cellulose, and inorganic dispersants such as magnesium pyrophosphate, calcium pyrophosphate, calcium phosphate, calcium carbonate, magnesium phosphate, magnesium carbonate and magnesium oxide. Among them, inorganic dispersants are preferable.

If the inorganic dispersant is used, it is preferable to use a surfactant at the same time. Examples of the surfactant include sodium dodecylbenzenesulfonate and sodium α-olefinsulfonate.

A shape and a structure of the polymerization container are not particularly limited as long as the container is conventionally used for suspension polymerization of the styrene-based monomer. A shape of a mixing impeller is not particularly limited, and specific examples thereof include paddle impellers such as a V-type paddle impeller, a pfaudler impeller, an inclined paddle impeller, a flat paddle impeller and a pull margin impeller, turbine impellers such as a turbine impeller and a fan turbine impeller, and propeller impellers such as a marine propeller impeller. Among these mixing impellers, paddle impellers are preferable. The mixing impeller may be a single-stage impeller or a multi-stage impeller. The polymerization container may be provided with a baffle.

A temperature of the aqueous medium when polymerizing the styrene-based monomer in micropellets is not particularly limited, but is preferably within −30 to +20° C. of a melting point of polyolefin-based resin particles used. More specifically, a temperature of 70 to 140° C. is preferable, and a temperature of 80 to 130° C. is more preferable. Further, the temperature of the aqueous medium may be fixed or elevated stepwise during a time period between start and completion of polymerization of the styrene-based monomer. When the temperature of the aqueous medium is elevated, it is preferable to elevate the temperature at a rate of 0.1 to 2° C./min.

Further, when particles consisting of a crosslinked polyolefin-based resin are used, crosslinking may be performed before impregnation with the styrene-based monomer, or may be performed while impregnating micropellets with the styrene-based monomer and carrying out polymerization, or may be performed after impregnating micropellets with the styrene-based monomer and carrying out polymerization.

Examples of a crosslinker used for crosslinking of the polyolefin-based resin include organic peroxides such as 2,2-di-t-butyl peroxybutane, dicumyl peroxide and 2,5-dimethyl-2,5-di-t-butyl peroxyhexane. The crosslinker may be used alone or in combination of two or more kinds. Preferably, an amount of crosslinker used is normally 0.05 to 1.0 parts by weight based on 100 parts by weight of polyolefin-based resin particles (micropellets).

Examples of a method for adding the crosslinker include a method of adding the crosslinker directly to polyolefin-based resin particles, a method of dissolving the crosslinker in a solvent, a plasticizer or a styrene-based monomer and then adding the resulting solution, and a method of dispersing the crosslinker in water and then adding the resulting dispersion. Among them, preferable is the method of dissolving the crosslinker in a styrene-based monomer and then adding the resulting solution.

Modified resin particles are obtained by the method described above.

(Method for Storing Expandable Composite Resin Particles)

Expandable composite resin particles are storage in a frozen state until they are subjected to pre-expansion. For example, the frozen storage is preferably storage in a container under a temperature of −5° C. or lower, more preferably storage in a container under a temperature of −15° C. or lower. A shape and a material of the container are not particularly limited as long as a set temperature can be retained for a long period. For increasing expanding capability retaining time, expandable composite resin particles are preferably subdivided in an amount corresponding to a capacity of an expansion machine, and frozen and stored.

(Frozen-Stored Expandable Composite Resin Particles)

Frozen-stored expandable composite resin particles are particles which include in composite resin particles of a polyolefin-based resin and a polystyrene-based resin 7.5 to 11% by weight of volatile blowing agent having pentane as a main component, and has 0.5 to 1.5% by weight of moisture attached to surfaces of the composite resin particles, and are stored in a container set at −5° C. or lower.

A more preferable content of the blowing agent is in a range of 8.5 to 10.0% by weight. For example, the content of the blowing agent can be set to 8.7% by weight, 8.9% by weight, 9.1% by weight, 9.3% by weight, 9.5% by weight, 9.7% by weight or 9.9% by weight.

A preferable amount of moisture is 0.6 to 1.2% by weight. For example, the amount of moisture can be set to 0.7% by weight, 0.8% by weight, 0.9% by weight, 1.0% by weight or 1.1% by weight. Frozen-stored expandable composite resin particles are preferably frozen and stored such that an amount of moisture attached to surfaces constituting the particles decreases by less than 10% of an amount of moisture attached to surfaces constituting expandable composite resin particles for frozen storage.

The particles have good working properties during pre-expansion because binding of particles is suppressed. In addition, the particles have an expanding capability retained for a long time period because a loss of the blowing agent is suppressed.

(Expanded Molded Article)

Expandable composite resin particles can be heated using a heating medium such as water steam as necessary and thereby pre-expanded to a predetermined bulk density to obtain pre-expanded particles.

In the present invention, binding of expandable composite resin particles by freezing is suppressed, and therefore pre-expansion can be performed work efficiently.

Pre-expanded particles preferably have a bulk expansion ratio of 5 to 70 (bulk density: 0.014 to 0.2 g/cm$^3$). A more preferable bulk expansion ratio is 10 to 60. If the bulk expansion ratio is more than 70, a closed-cell ratio of pre-expanded particles may decrease, resulting in a reduction in strength of an expanded molded article obtained by expanding pre-expanded particles. On the other hand, if the bulk expansion ratio is less than 5, a weight of an expanded molded article obtained by expanding pre-expanded particles may increase.

Next, pre-expanded particles are filled in a die of a molding machine, and secondarily expanded by heating, and pre-expanded particles are fused together into a united body, whereby an expanded molded article having a desired shape can be obtained. As the molding machine, an EPS molding machine or the like that is used for producing an expanded molded article from polystyrene-based resin pre-expanded particles can be used.

(Applications of Expanded Molded Article)

The obtained expanded molded article can be used for applications such as buffer materials (cushion materials) of electric appliances, and conveyance containers for electronic components, various kinds of industrial materials, foods and the like. The expanded molded article can also be suitably used as a core material of a bumper for a car and an impact energy absorber such as a door interior buffer material.

EXAMPLES

Hereinbelow, the present invention will be further described by way of Examples, but the present invention is not limited by these Examples.

<Average Particle Diameter>

The average particle diameter is a value expressed by D50. Specifically, particles are classified by sieving with JIS standard sieves of sieve opening: 4.00 mm, sieve opening: 3.35 mm, sieve opening: 2.80 mm, sieve opening: 2.36 mm, sieve opening: 2.00 mm, sieve opening: 1.70 mm, sieve opening: 1.40 mm, sieve opening: 1.18 mm, sieve opening: 1.00 mm, sieve opening: 0.85 mm, sieve opening: 0.71 mm, sieve opening: 0.60 mm, sieve opening: 0.50 mm, sieve opening: 0.425 mm, sieve opening: 0.355 mm, sieve opening: 0.300 mm, sieve opening: 0.250 mm, sieve opening: 0.212 mm and sieve opening: 0.180 mm, a cumulative weight distribution curve is obtained from results thereof, a particle diameter corresponding to a cumulative weight of 50% (median diameter) is determined based on the cumulative weight distribution curve, and the particle diameter is designated as an average particle diameter in Examples.

<Amount of Internal Moisture in Composite Resin Particles>

Composite resin particles (5 g) are immersed in 200 ml of methanol (manufactured by Wako Pure Chemical Industries, Ltd.; for organic synthesis; purity 99.8%; moisture content: 50 ppm or less), and stirred for about a minute to remove an attached moisture on surfaces. Thereafter, composite resin particles are separated from methanol by a vacuum filter, and air-dried for 5 minutes. About 0.5 g of the obtained composite resin particles are precisely weighed by a scale capable of weighing to an accuracy of 0.1 mg. An amount of moisture generated in a heating furnace method at 150° C. from the precisely weighed particles is measured by a Karl Fischer titration method using Trace Moisture Measurement Device (AQ-2100 manufactured by Hiranuma Sangyo Corporation) and Automatic Heat type Moisture Vaporization Equipment (EV-2010 manufactured by Hiranuma Sangyo Corporation). A measured value is defined as an amount of internal moisture.

Measurement Conditions

Measurement environment: room temperature: 23±2° C., humidity: 40±10%
Vaporization temperature: 150° C.
Carrier gas (flow rate): nitrogen (100 mL/min)
Number of tests: 3
Amount of sample: about 0.5 g A blank moisture amount is defined as a total amount of a moisture of air in a sample container and a moisture attached to a side surface of the container.

<Amount of Moisture of Expandable Composite Resin Particles>

First, a total amount of moisture of expandable composite resin particles, i.e. a total amount of an internal moisture amount and a surface-attached moisture amount, is measured. For a method, about 0.5 g of particles are precisely weighed by a scale capable of weighing to an accuracy of 0.1 mg. An amount of moisture generated in a heating furnace method at 150° C. from the precisely weighed particles is measured by a Karl Fischer titration method using Trace Moisture Measurement Device (AQ-2100 manufactured by Hiranuma Sangyo Corporation) and Automatic Heated Moisture Vaporization Equipment (EV-2010 manufactured by Hiranuma Sangyo Corporation).

Measurement Conditions

Measurement environment: room temperature: 23±2° C., humidity: 40±10%
Vaporization temperature: 150° C.
Carrier gas (flow rate): nitrogen (100 mL/min)
Number of tests: 3
Amount of sample: about 0.5 g A blank moisture amount is defined as a total amount of a moisture of air in a sample container and a moisture attached to a side surface of the container.

Next, an amount of internal moisture of expandable composite resin particles is measured. For a method, 5 g of expandable composite resin particles are immersed in 200 ml of methanol (manufactured by Wako Pure Chemical Industries, Ltd.; for organic synthesis; purity 99.8%; moisture content: 50 ppm or less), and stirred for about a minute to remove an attached moisture on surfaces. Thereafter, particles are separated from methanol by a vacuum filter, and air-dried for 5 minutes. About 0.5 g of the obtained particles are precisely weighed by a scale capable of weighing to an accuracy of 0.1 mg. An amount of moisture generated in a heating furnace method at 150° C. from the precisely weighed particles is measured by a Karl Fischer titration method using Trace Moisture Measurement Device (AQ-2100 manufactured by Hiranuma Sangyo Corporation) and Automatic Heated Moisture Vaporization Equipment (EV-2010 manufactured by Hiranuma Sangyo Corporation).

Measurement Conditions

Measurement environment: room temperature: 23±2° C., Humidity: 40±10%
Vaporization temperature: 150° C.
Carrier gas (flow rate): nitrogen (100 mL/min)
Number of tests: 3
Amount of sample: about 0.5 g A blank moisture amount is defined as a total amount of a moisture of air in a sample container and a moisture attached to a side surface of the container.

A value obtained by subtracting an amount of internal moisture from a measured total moisture amount is defined as an amount of surface-attached moisture.

<Content of Blowing Agent>

Expanded composite resin particles (5 to 20 mg) are precisely weighed and used as a measurement sample. The measurement sample is set in a pyrolyzer (PYR-1A manufactured by Shimadzu Corporation) kept at 180 to 200° C., and the measurement sample is sealed, and then heated for 120 seconds to release a blowing agent component. From the released blowing agent component, a chart of the blowing agent is obtained using a gas chromatograph (GC-14B manufactured by Shimadzu Corporation, detector: FID). A content of the blowing agent (gas content: % by weight) in expandable composite resin particles is calculated from the obtained chart based on a calibration curve of the blowing agent component measured beforehand.

<Amount of Attached Moisturizing Agent>

For a sample liquid for measurement of an amount of attached moisturing agent on a surface, 10 g of sample is precisely weighed in a 100 ml glass bottle, 40 mL of methanol for HPLC is metered by a whole pippete, the mixture is stirred for 30 minutes by an addition stirrer bar, the resulting supernatant liquid is then filtered by an aqueous/nonaqueous (dual) 0.2 μm chromatographic disk, and a liquid thus obtained is used.

Measurement conditions are as follows:
Column: TSKgel ODS-80TS QA 4.6*150 manufactured by Tosoh Corporation,
Column temperature: 40° C.,
Mobile phase: methanol for HPLC,
Flow rate: 0.7 mL/min,
Pump temperature: room temperature,
Injection amount: 50 μL,
Detection: evaporative light scattering. In addition, a calibration curve is drawn beforehand using a moisturizing agent (in Examples, standard polyethylene glycol for calibration curves (trade name: PEG#300) manufactured by NOF CORPORATION is used).

An amount of moisturizing agent attached to a sample surface is calculated from a concentration of the moisturizing agent in a sample liquid for measurement obtained from the calibration curve. For a detector used for measurement of the concentration of the moisturizing agent, an evaporative light scattering detector (ELSD-2000 manufactured by Altech Co., Ltd.) is used, and device conditions are Drift Tube temp.: 60° C., GAS Flow: 1.6 mL/min, GAIN=1 (impactor=off).

<Evaluation of Expanding Property>

(1) Where the Polyolefin-Based Resin is a Polyethylene-Based Resin

A weight of about 2 g of expandable composite resin particles (a) is precisely weighed to two decimal places, and the particles are heated with water steam of 0.07 MPa for a predetermined time period (2 or 3 minutes). The obtained pre-expanded particles are placed in a 500 cm$^3$ measuring cylinder having a minimum scale unit of 5 cm$^3$, and a pressing device, which is a circular resin plate having a size slightly smaller than an opening diameter of the measuring cylinder and in which a rod-like resin plate having a width of about 1.5 cm and a length of about 30 cm is erectly fixed at a center thereof, is abutted against the particles, a volume of pre-expanded particles (b) is read, and a bulk expansion ratio of pre-expanded particles is determined from formula (b)/(a). The bulk expansion ratio is defined as an expanding property of expandable composite resin particles in a predetermined heating time.

If the expanding property at this time is 40 times or more, it is determined that expandable composite resin particles have a sufficient expanding capability for practical use (judged ○), and if the expanding property is less than 40 times, it is determined that expandable composite resin particles do not have an expanding capability sufficient for enduring practical use (judged X).

If a difference of the expanding property between the former and the latter is 7.5 times or less, it is determined that expandable composite resin particles have retain a very good expanding capability for practical use (judged ⊙), and if a difference between the former and the latter is more than 7.5 times and not more than 10 times, it is determined that expandable composite resin particles have retained a sufficient expanding capability for practical use (judged ○), and if a difference between the former and the latter is more than 10 times, it is determined that expandable composite resin particles do not have an temporal expanding capability sufficient for enduring practical use (judged X).

(2) Where the Polyolefin-Based Resin is a Polypropylene-Based Resin (Examples 11 to 13)

Evaluations are made in the same manner as in (1), except that conditions for heating with steam are changed so that particles are heated at a pressure of 0.15 MPa for 2 minutes.

<Evaluation of Frozen State>

About 1,000 g of frozen and stored expandable composite resins are placed on a screen of a JIS standard sieve having a sieve opening of 2.80 mm. Then, provided that an operation of moving the sieve in a horizontal direction over a distance of about 15 cm and then returning the sieve to an original position is one-time reciprocation, the sieve is reciprocated 10 times for an intended time period of about 10 seconds to classify expandable composite resin particles. If no expandable composite resin particles remain on the screen, it is determined that expandable composite resin particles are not bound together by freezing (judged ⊙), and an amount of expandable composite resin particles remaining on the screen is less than 50 g, it is determined that there arises no inconvenience for practical use (judged ○), and if expandable composite resin particles remain in an amount more than 50 g, it is determined that binding of expandable composite resin particles by freezing is significant, and there arises considerable inconvenience in terms of operations for practical use (judged X).

<Method for Producing Pre-Expanded Particles>

Expandable composite resin particles are stored in a freezer (set at −25° C.) for 168 hours, then left standing under an environment of room temperature: 25° C. and humidity: 50% for an hour, and then pre-expanded under the following conditions.

Expandable composite resin particles (500 to 2,000 g) are charged in a normal pressure pre-expanding machine (internal volume: 50 L) pre-heated by steam, steam is introduced up to a setting of about 0.02 MPa with stirring, and air is also fed at the same time, so that particles are expanded to a predetermined bulk density (bulk expansion ratio) in about 2 to 3 minutes.

<Bulk Density and Bulk expansion ratio of Pre-expanded Particles>

A weight of about 5 g of pre-expanded particles (a) is weighed to two decimal places. Next, weighed pre-expanded particles are placed in a 500 cm$^3$ measuring cylinder having a minimum scale unit of 5 cm$^3$. A pressing device, which is a resin circular plate having a size slightly smaller than an opening diameter of the measuring cylinder and in which a rod-like resin plate having a width of about 1.5 cm and a length of about 30 cm is erectly fixed at a center thereof, is abutted against the pre-expanded particles. In this state, a volume of pre-expanded particles (b) is read, and a bulk density (g/cm$^3$) of pre-expanded particles is determined from formula (a)/(b). The bulk expansion ratio is defined as an inverse number of the bulk density, i.e. formula (b)/(a).

<Method for Evaluating Cell Unevenness of Pre-expanded Particles>

An average cell diameter of pre-expanded particles is measured in the following manner in accordance with a test method of ASTM D2842-69.

Particles are pre-expanded to a bulk expansion ratio of 30 or 50, and 30 of the pre-expanded particles are randomly collected. The particles are each cut from a surface through a center into two halves by a blade, and cross-sections of halved slices are photographed in a magnification of 15 to 30 (200 in some cases) with a scanning electron microscope (S-3000N manufactured by Hitachi, Ltd.).

Photographed images are printed on A4 sheets on a one-to-one basis, two straight lines extending through a center are drawn so as to be orthogonal with each other, and a length of the straight line and the number of cells on the straight line are measured (cells contacting the straight line are also measured).

From the results of measurements described above, an average chord length (t) of cells is calculated. However, arbitrarily straight lines should be drawn such that cells do not contact only at contact points wherever possible (if there are ones contacting only at contact points, the number thereof is included in the number of cells).

$$\text{average chord length } t = \text{line length}/(\text{number of cells} \times \text{photo magnification})$$

Then, an cell diameter is calculated from the following formula.

$$\text{cell diameter } d = t/0.616$$

Further, an arithmetic average thereof is defined as an average cell diameter.

average cell diameter $D$ (mm)=(cell diameter $n=1$+cell diameter $n=2$+ ... +cell diameter $n=30$)/30

Next, a ratio (U) of the average cell diameter (D) to a standard deviation (s) representing unevenness of cell diameters (U=s/D) is calculated, and this is defined as a degree of cell unevenness.

<Falling Ball Impact Value of Expanded Molded Article>

A falling ball impact strength is measured in accordance with a method described in JIS K7211:1976 "General Rules for Testing Impact Strength of Rigid Plastics by the Falling Weight Method".

From expandable composite resin particles, an expanded molded article is obtained such that a bulk expansion ratio is 40. The obtained expanded molded article is dried at 50° C. for a day, and a test piece of 40 mm×215 mm×20 mm (thickness) (none of all six faces has a skin) is cut out from the expanded molded article.

Next, both ends of the test piece are fixed by a clamp so that intervals between supporting points are each 150 mm, and a rigid ball having a weight of 321 g is made to fall from a predetermined height to a center portion of the test piece to observe presence/absence of a breakage of the test piece.

A test is conducted with the rigid ball falling height (test height) being changed at intervals of 5 cm from a minimum height for all of 5 test pieces to be broken to a maximum height for none of the test pieces to be broken, and a falling ball impact value (cm), i.e. a 50% breaking height, is calculated from the following formula.

$H50=Hi+d[\Sigma(i \cdot ni)/N \pm 0.5]$

Symbols in the formula have the following meanings.

H50: 50% breaking height (cm)

Hi: a test height (cm) when a height level (i) is 0, and a height with which the test piece is expected to be broken d: height interval (cm) when the test height is elevated or lowered i: a height level which increases or decreases one by one (i= ... −3, −2, −1, 0, 1, 2, 3 ... ) with the height level at Hi being 0 ni: the number of test pieces broken (or not broken) at each level, for which data of the greater number is used (if the numbers are the same, either may be used)

N: the total number (N=Σni) of test pieces broken (or not broken) at each level, for which data of the greater number is used (if the numbers are the same, either may be used)

±0.5: a negative number is employed when data of broken test pieces is used, and a positive number is employed when data of not-broken test pieces is used The obtained falling ball impact value is evaluated on the following criteria. A greater falling ball impact value shows a higher impact resistance of the expanded molded article.

Example 1 a) Production of Polyethylene-Modified Styrene-Based Resin Particles of Polyethylene-Based Resin (PE)/Polystyrene-Based Resin (PS)=30/70

Ethylene-vinyl acetate copolymer resin particles (EVA; LV-115 manufactured by Japan Polyethylene Corporation) were heated and mixed in an extruder and pelletized by an underwater cutting method (ethylene-vinyl acetate copolymer resin particles were adjusted to 80 mg per 100 particles). 10.5 kg of the ethylene-vinyl acetate copolymer resin particles were placed in a 100 L autoclave with a stirrer. Thereafter, 45 kg of pure water, 315 g of magnesium pyrophosphate and 1.6 g of sodium dodecylbenzenesulfonate were added as an aqueous medium, the mixture was stirred to suspend the particles in the aqueous medium, and the suspension was held for 10 minutes, and then heated to 60° C.

Then, 4.5 kg of styrene monomer with 5.4 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 130° C., and continuously stirred at this temperature for 105 minutes. Thereafter, the suspension was cooled down to a temperature of 90° C., and 11.4 g of sodium dodecylbenzenesulfonate were added to the suspension. Thereafter, 6.2 kg of styrene monomer with 39.2 g of benzoyl peroxide and 4.9 g of t-butyl peroxybenzoate as polymerization initiators and 98.7 g of dicumyl peroxide as a crosslinker dissolved therein were added dropwise for 2 hours. Then, 13.8 kg of styrene monomer with 175 g of ethylenebisstearic acid amide dissolved therein were added dropwise for 2 hours. After completion of dropwise addition, the mixture was held at 90° C. for an hour, then heated to 143° C., and held at this temperature for 2 hours to complete polymerization. Thereafter, the resulting product was cooled to ordinary temperature, and polyethylene-modified styrene-based resin particles (average particle diameter: 1.61 mm) were extracted.

The styrene monomer was used in an amount of 233 parts by weight based on 100 parts by weight of ethylene-vinyl acetate copolymer resin particles.

b) Adjustment of Amount of Internal Moisture

Polyethylene-modified styrene-based resin particles obtained as described above were dewatered by a basket-type centrifugal separator, and dewatered polyethylene-modified styrene-based resin particles were dried by passing air for 45 minutes in a cylindrical dryer at ordinary temperature. Polyethylene-modified styrene-based resin particles thus obtained had an internal moisture amount of 0.288% by weight.

c) Impregnation with Blowing Agent (Wet Impregnation Method)

2 kg of polyethylene-modified styrene-based resin particles obtained as described above were placed in a 5 L of autoclave with a stirrer. Thereafter, 2 kg of pure water, 2 g of sodium dodecylbenzenesulfonate and 0.6 g of polyoxyethylene laurylamine were added as an aqueous medium, the mixture was stirred to suspend the particles in the aqueous medium, and the suspension was held for 10 minutes, and then heated to 60° C. Then, 240 g of pentane containing 97% or more of i-pentane (gas type a: trade name: ISOPENTANE manufactured by SK Corporation) were added. Thereafter, the mixture was continuously stirred at this temperature for 3 hours. Thereafter, the mixture was cooled to ordinary temperature, and particles were extracted.

d) Adjustment of Amount of Surface-attached Moisture

Expandable composite resin particles obtained as described above were dewatered for a minute by a basket-type centrifugal separator to adjust the amount of surface-attached moisture to values shown in Table 1 (the amount of internal moisture of expandable composite resin particles was adjusted at the same time). 0.05% by weight of polyethylene glycol having a weight average molecular weight of 300 (trade name: PEG#300 manufactured by NOF CORPORATION) were added to expandable composite resin particles, and the resulting product was uniformly mixed.

Expandable composite resin particles were stored under an environment of room temperature: 25° C. and humidity: 50%, and a change in expanding capability over time was evaluated. Evaluation results are shown in Table 1.

e) Storage

About 1,000 g of expandable composite resin particles were filled in a 2 L aluminum airtight container, and stored for 168 hours in a freezer set at −25° C.

Frozen and stored expandable composite resin particles were unsealed, and evaluated by the aforementioned method for evaluating a frozen state. Evaluation results are shown in Table 1.

f) Pre-Expansion

After being stored in the manner described above, expandable composite resin particles were left standing under an environment of room temperature: 25° C. and humidity: 50% for an hour with the particles filled in a 2 L aluminum airtight container, and the expandable composite resin particles were pre-expanded under the aforementioned pre-expansion conditions with a bulk expansion ratio of 50 being targeted, whereby pre-expanded particles having a bulk expansion ratio of 50 were obtained.

The obtained pre-expanded particles were evaluated by the aforementioned method for evaluating cell unevenness of pre-expanded particles. Evaluation results are shown in Table 4.

Example 2

Production of polyethylene-modified styrene-based resin particles and adjustment of an amount of internal moisture were performed in the same manner as in a) and b) of Example 1, impregnation with a blowing agent was performed in the same manner as in c) of Example 1 except that 260 g of pentane containing 97% or more of i-pentane (gas type a: trade name: ISOPENTANE manufactured by SK Corporation) were used, adjustment of an amount of surface-attached moisture was performed in the same manner as in d) of Example 1 except that dewatering time was 5 minutes, and storage and pre-expansion of expandable composite resin particles were performed in the same manner as in e) and f) of Example 1.

Various evaluation results are shown in Table 1.

Example 3 a) Production of Polyethylene-Modified Styrene-Based Resin Particles of Polyethylene-based Resin (PE)/Polystyrene-based Resin (PS)=40/60

Ethylene-vinyl acetate copolymer resin particles (LV-115 manufactured by Japan Polyethylene Corporation) were heated and mixed in an extruder and pelletized by an underwater cutting method (ethylene-vinyl acetate copolymer resin particles were adjusted to 80 mg per 100 particles). 14 kg of the ethylene-vinyl acetate copolymer resin particles were placed in a 100 L autoclave with a stirrer. Thereafter, 45 kg of pure water, 315 g of magnesium pyrophosphate and 1.6 g of sodium dodecylbenzenesulfonate were added as an aqueous medium, the mixture was stirred to suspend the particles in the aqueous medium, and the suspension was held for 10 minutes, and then heated to 60° C.

Then, 6.0 kg of styrene monomer with 7.2 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 130° C., and continuously stirred at this temperature for 2 hours. Thereafter, the suspension was cooled down to a temperature of 90° C., and 11.4 g of sodium dodecylbenzenesulfonate were added to the suspension. Thereafter, 5 kg of styrene monomer with 39.9 g of benzoyl peroxide and 3.2 g of t-butyl peroxybenzoate as polymerization initiators and 102.2 g of dicumyl peroxide as a crosslinker dissolved therein were added dropwise for 1.5 hours. Then, 10 kg of styrene monomer with 105 g of ethylenebisstearic acid amide dissolved therein were added dropwise for 1.5 hours. After completion of dropwise addition, the mixture was held at 90° C. for an hour, then heated to 143° C., and held at this temperature for 2.5 hours to complete polymerization. Thereafter, the resulting product was cooled to ordinary temperature, and polyethylene-modified styrene-based resin particles (average particle diameter: 1.55 mm) were extracted.

The styrene monomer was used in an amount of 150 parts by weight based on 100 parts by weight of ethylene-vinyl acetate copolymer resin particles.

An amount of internal moisture was adjusted in the same manner as in b) of Example 1 except that the particles were dried by passing air for 30 minutes. Polyethylene-modified styrene-based resin particles thus obtained had an internal moisture amount of 0.381% by weight. Impregnation with a blowing agent was performed in the same manner as in c) of Example 1 except that a temperature of the aqueous medium was 50° C. and 280 g of pentane containing 97% or more of i-pentane (gas type a: trade name: ISOPENTANE manufactured by SK Corporation) were used, and adjustment of an amount of surface-attached moisture and storage and pre-expansion of expandable composite resin particles were performed in the same manner as in d), e) and f) of Example 1.

Various evaluation results are shown in Table 1.

Example 4 a) Production of Polyethylene-Modified Styrene-Based Resin Particles of Polyethylene-Based Resin (PE)/Polystyrene-Based Resin (PS)=20/80

Linear low-density polyethylene resin particles (LLDPE; NF-444A manufactured by Japan Polyethylene Corporation) were heated and mixed in an extruder and pelletized by an underwater cutting method (linear low-density polyethylene resin particles were adjusted to 40 mg per 100 particles). 7.0 kg of the linear low-density polyethylene resin particles were placed in a 100 L autoclave with a stirrer. Thereafter, 40 kg of pure water, 315 g of magnesium pyrophosphate and 1.6 g of sodium dodecylbenzenesulfonate were added as an aqueous medium, the mixture was stirred to suspend the particles in the aqueous medium, and the suspension was held for 10 minutes, and then heated to 60° C.

Then, 3.5 kg of styrene monomer with 8.75 g of dicumyl peroxide dissolved therein were added dropwise to the suspension for 30 minutes. After dropwise addition, the mixture was held for 30 minutes, so that polyethylene-based resin particles were caused to absorb the styrene monomer. After absorption, the mixture was heated to 135° C., and continuously stirred at this temperature for 2 hours.

Thereafter, the suspension was cooled down to a temperature of 110° C., and 11.4 g of sodium dodecylbenzenesulfonate were added to the suspension. Thereafter, 24.5 kg of styrene monomer with 98 g of t-butyl peroxybenzoate as a polymerization initiator dissolved therein were added dropwise for 4 hours. Then, a dispersion liquid of 350 g of ethylenebisstearic acid amide, 3 g of sodium dodecylbenzenesulfonate and 5 kg of pure water was added dropwise for 30 minutes.

After dropwise addition, the mixture was held at 110° C. for an hour, then heated to 140° C., and held for 3 hours to complete polymerization. Thereafter, the resulting product was cooled to ordinary temperature, and polyethylene-modified styrene-based resin particles (average particle diameter: 1.33 mm) were extracted.

The styrene monomer was used in an amount of 400 parts by weight based on 100 parts by weight of linear low-density polyethylene.

An amount of internal moisture was adjusted in the same manner as in b) of Example 1 except that the particles were dried by passing air for 60 minutes. Polyethylene-modified styrene-based resin particles thus obtained had an internal moisture amount of 0.178% by weight. Impregnation with a blowing agent was performed in the same manner as in c) of Example 1 except that a temperature of the aqueous medium was 70° C., adjustment of an amount of surface-attached moisture was performed in the same manner as in d) of Example 1 except that dewatering time was 5 minutes, and storage and pre-expansion of expandable composite resin particles were performed in the same manner as in e) and f) of Example 1.

Various evaluation results are shown in Table 1.

Example 5

Production of polyethylene-modified styrene-based resin particles and adjustment of an amount of internal moisture were performed in the same manner as in a) and b) of Example 4.

c) and d) Impregnation with Blowing Agent (Dry Impregnation) and Adjustment of Amount of Surface-attached Moisture 15 kg of polyethylene-modified styrene-based resin particles obtained as described above, 4.5 g of polyoxyethylene laurylamine, 7.5 g of polyethylene glycol (PEG#300 manufactured by NOF CORPORATION) and 150 g of pure water were placed in a pressure-resistance rotary mixer having an internal volume of 50 L, rotated, held for 10 minutes, and then heated to 70° C. Then, 1,800 g of pentane containing 97% or more of i-pentane (gas type a: trade name: ISOPENTANE manufactured by SK Corporation) were added while rotating the mixture at this temperature. The mixture was continuously rotated at this temperature for 3 hours to perform impregnation with a blowing agent and adjustment of an amount of surface-attached moisture. Thereafter, the mixture was cooled to ordinary temperature, and particles were extracted.

The expandable composite resin particles were stored under an environment of room temperature: 25° C. and humidity: 50%, and a change in expanding capability over time was evaluated. Evaluation results are shown in Table 1.

Storage and pre-expansion of expandable composite resin particles were performed in the same manner as in e) and f) of Example 1.

Various evaluation results are shown in Table 1.

Example 6

Production of polyethylene-modified styrene-based resin particles and adjustment of an amount of internal moisture were performed in the same manner as in a) and b) of Example 4, impregnation (dry impregnation) with a blowing agent and adjustment of an amount of surface-attached moisture were performed in the same manner as in c) and d) of example 5 except that an amount of pure water was 300 g and 1,800 g of pentane of n-pentane/1-pentane=75/25 to 85/15 (gas type b: trade name: PENTANE manufactured by Cosmo Oil Co., Ltd.) were used, and storage and pre-expansion of expandable composite resin particles were performed in the same manner as in e) and f) of Example 1.

Various evaluation results are shown in Table 1.

Example 7

Production of polyethylene-modified styrene-based resin particles and adjustment of an amount of internal moisture were performed in the same manner as in a) and b) of Example 4, impregnation (dry impregnation) with a blowing agent and adjustment of an amount of surface-attached moisture were performed in the same manner as in c) and d) of example 6 except that polyethylene glycol (PEG#300 manufactured by NOF CORPORATION) was not used, and storage and pre-expansion of expandable composite resin particles were performed in the same manner as in e) and f) of Example 1.

Various evaluation results are shown in Table 1.

Example 8

Production of polyethylene-modified styrene-based resin particles was performed in the same manner as in a) of Example 1, and adjustment of an amount of internal moisture was performed in the same manner as in b) of Example 1 except that the particles were dried by passing air for 5 hours. Polyethylene-modified styrene-based resin particles thus obtained had an internal moisture amount of 0.018% by weight. Impregnation with a blowing agent was performed in the same manner as in c) of Example 1 except that 280 g of pentane containing 97% or more of i-pentane (gas type a: trade name: ISOPENTANE manufactured by SK Corporation) were used, and adjustment of an amount of surface-attached moisture and storage and pre-expansion of expandable composite resin particles were performed in the same manner as in d), e) and f) of Example 1.

Various evaluation results are shown in Tables 1 and 4.

Example 9 a) Production of Polyethylene-Modified Styrene-Based Resin Particles of Polyethylene-Based Resin (PE)/Polystyrene-Based Resin (PS)=20/80

High-density polyethylene resin particles (HDPE; trade name: 09S53B manufactured by Tosoh Corporation) were heated and mixed in an extruder and pelletized by an underwater cutting method (high-density polyethylene resin particles were adjusted to 20 mg per 100 particles). 7.7 kg of the high-density polyethylene resin particles were placed in a 100 L autoclave with a stirrer. Thereafter, 45 kg of pure water, 315 g of magnesium pyrophosphate and 6.0 g of sodium dodecylbenzenesulfonate were added as an aqueous medium, the mixture was stirred to suspend the particles in the aqueous medium, and the suspension was held for 10 minutes, and then heated to 60° C.

Then, 2.5 kg of styrene monomer with 5.0 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 130° C., and continuously stirred at this temperature for 2.0 hours. Thereafter, the suspension was cooled down to a temperature of 120° C., and 42.2 g of sodium dodecylbenzenesulfonate were added to the suspension. Thereafter, 19.4 kg of styrene monomer with 82.0 g of dicumyl peroxide as a polymerization initiator dissolved therein were added dropwise for 4 hours.

Then, 4.9 kg of styrene monomer with 262.5 g of ethylenebisstearic acid amide dissolved therein were added dropwise for an hour. After completion of dropwise addition, the mixture was held at 120° C. for an hour, then heated to 140° C., and held at this temperature for 3 hours to complete polymerization. Thereafter, the resulting product was cooled to ordinary temperature, and polyethylene-modified styrene-based resin particles (average particle diameter: 1.22 mm) were extracted.

The styrene monomer was used in an amount of 400 parts by weight based on 100 parts by weight of high-density polyethylene resin particles.

b) Adjustment of Amount of Internal Moisture

Polyethylene-modified styrene-based resin particles obtained as described above were dewatered by a basket-type centrifugal separator, and dewatered polyethylene-modified styrene-based resin particles were dried by passing air for 30 minutes in a cylindrical dryer at ordinary temperature. Polyethylene-modified styrene-based resin particles thus obtained had an internal moisture amount of 0.486% by weight.

c) Impregnation with Blowing Agent (Wet Impregnation Method)

2 kg of polyethylene-modified styrene-based resin particles obtained as described above were placed in a 5 L of autoclave with a stirrer. Thereafter, 2 kg of pure water, 2 g of sodium dodecylbenzenesulfonate and 0.6 g of polyoxyethylene laurylamine were added as an aqueous medium, the mixture was stirred to suspend the particles in the aqueous medium, and the suspension was held for 10 minutes, and then heated to 70° C. Then, 340 g of pentane containing 97% or more of i-pentane (gas type a: trade name: ISOPENTANE manufactured by SK Corporation) were added. Thereafter, the mixture was continuously stirred at this temperature for 3 hours. Thereafter, the mixture was cooled to ordinary temperature, and particles were extracted.

d) Adjustment of Amount of Surface-Attached Moisture

Expandable composite resin particles obtained as described above were dewatered for a minute by a basket-type centrifugal separator to adjust the amount of surface-attached moisture to values shown in Table 1 (the amount of internal moisture of expandable composite resin particles was adjusted at the same time). 0.05% by weight of polyethylene glycol having a weight average molecular weight of 300 (trade name: PEG#300 manufactured by NOF CORPORATION) were added to expandable composite resin particles, and the resulting product was uniformly mixed.

Expandable composite resin particles were stored under an environment of room temperature: 25° C. and humidity: 50%, and a change in expanding capability over time was evaluated. Evaluation results are shown in Table 1.

e) Storage

About 1,000 g of expandable composite resin particles were filled in a 2 L aluminum airtight container, and stored for 168 hours in a freezer set at −25° C.

Frozen and stored expandable composite resin particles were unsealed, and evaluated by the aforementioned method for evaluating a frozen state. Evaluation results are shown in Table 1.

f) Pre-Expansion

After being stored in the manner described above, expandable composite resin particles were left standing under an environment of room temperature: 25° C. and humidity: 50% for an hour with the particles filled in a 2 L aluminum airtight container, and the expandable composite resin particles were pre-expanded under the aforementioned pre-expansion conditions with a bulk expansion ratio of 50 being targeted, whereby pre-expanded particles having a bulk expansion ratio of 50 were obtained.

Various evaluation results are shown in Table 1.

Example 10 a) Production of Polyethylene-Modified Styrene-Based Resin Particles of Polyethylene-Based Resin (PE)/Polystyrene-Based Resin (PS)=30/70

High-density polyethylene resin particles (trade name: 09S53B manufactured by Tosoh Corporation) were heated and mixed in an extruder and pelletized by an underwater cutting method (high-density polyethylene resin particles were adjusted to 20 mg per 100 particles). 10.5 kg of the high-density polyethylene resin particles were placed in a 100 L autoclave with a stirrer. Thereafter, 45 kg of pure water, 315 g of magnesium pyrophosphate and 6.0 g of sodium dodecylbenzenesulfonate were added as an aqueous medium, the mixture were stirred to suspend the particles in the aqueous medium, and the suspension was held for 10 minutes, and then heated to 60° C.

Then, 3.5 kg of styrene monomer with 7.0 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 130° C., and continuously stirred at this temperature for 2.0 hours. Thereafter, the suspension was cooled down to a temperature of 120° C., and 42.2 g of sodium dodecylbenzenesulfonate were added to the suspension. Thereafter, 15.8 kg of styrene monomer with 73.5 g of dicumyl peroxide as a polymerization initiator dissolved therein were added dropwise for 210 minutes. Then, 4.5 kg of styrene monomer with 262.5 g of ethylenebisstearic acid amide dissolved therein were added dropwise for an hour. After completion of dropwise addition, the mixture was held at 120° C. for an hour, then heated to 140° C., and held at this temperature for 3 hours to complete polymerization. Thereafter, the resulting product was cooled to ordinary temperature, and polyethylene-modified styrene-based resin particles (average particle diameter: 1.05 mm) were extracted.

The styrene monomer was used in an amount of 233 parts by weight based on 100 parts by weight of high-density polyethylene resin particles.

b) Adjustment of Amount of Internal Moisture

Polyethylene-modified styrene-based resin particles obtained as described above were dewatered by a basket-type centrifugal separator, and dewatered polyethylene-modified styrene-based resin particles were dried by passing air for 30 minutes in a cylindrical dryer at ordinary temperature. Polyethylene-modified styrene-based resin particles thus obtained had an internal moisture amount of 0.281% by weight.

c) Impregnation with Blowing Agent (Wet Impregnation Method)

2 kg of polyethylene-modified styrene-based resin particles obtained as described above were placed in a 5 L of autoclave with a stirrer. Thereafter, 2 kg of pure water, 2 g of sodium dodecylbenzenesulfonate and 0.6 g of polyoxyethylene laurylamine were added as an aqueous medium, the mixture was stirred to suspend the particles in the aqueous medium, and the suspension was held for 10 minutes, and then heated to 70° C. Then, 340 g of pentane containing 97% or more of i-pentane (gas type a: trade name: ISOPENTANE manufactured by SK Corporation) were added. Thereafter, the mixture was continuously stirred at this temperature for 3 hours. Thereafter, the mixture was cooled to ordinary temperature, and particles were extracted.

d) Adjustment of Amount of Surface-Attached Moisture

Expandable composite resin particles obtained as described above were dewatered for a minute by a basket-type centrifugal separator to adjust the amount of surface-attached moisture to values shown in Table 1 (the amount of internal moisture of expandable composite resin particles was adjusted at the same time). 0.05% by weight of polyethylene glycol having a weight average molecular weight of 300 (trade name: PEG#300 manufactured by NOF CORPORATION) were added to expandable composite resin particles, and the resulting product was uniformly mixed.

Expandable composite resin particles were stored under an environment of room temperature: 25° C. and humidity: 50%, and a change in expanding capability over time was evaluated. Evaluation results are shown in Table 1.

e) Storage

About 1,000 g of expandable composite resin particles were filled in a 2 L aluminum airtight container, and stored for 168 hours in a freezer set at −25° C.

Frozen and stored expandable composite resin particles were unsealed, and evaluated by the aforementioned method for evaluating a frozen state. Evaluation results are shown in Table 1.

f) Pre-Expansion

After being stored in the manner described above, expandable composite resin particles were left standing under an environment of room temperature: 25° C. and humidity: 50% for an hour with the particles filled in a 2 L aluminum airtight container, and the expandable composite resin particles were pre-expanded under the aforementioned pre-expansion conditions with a bulk expansion ratio of 50 being targeted, whereby pre-expanded particles having a bulk expansion ratio of 50 were obtained.

Various evaluation results are shown in Table 1.

Example 11 a) Production of Polypropylene-Modified Styrene-Based Resin Particles of Polypropylene-Based Resin (PP)/Polystyrene-Based Resin (PS)=40/60

Polypropylene resin particles (trade name: F-744NP manufactured by Prime Polymer Co., Ltd.) were heated and mixed in an extruder and pelletized by an underwater cutting method (polypropylene resin particles were adjusted to 60 mg per 100 particles). 14.0 kg of the polypropylene resin particles were placed in a 100 L autoclave with a stirrer. Thereafter, 41 kg of pure water, 400 g of magnesium pyrophosphate and 4.0 g of sodium dodecylbenzenesulfonate were added as an aqueous medium, the mixture were stirred to suspend the particles in the aqueous medium, and the suspension was held for 10 minutes, and then heated to 60° C.

Then, 7.0 kg of styrene monomer with 14 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 140° C., and continuously stirred at this temperature for 2 hours. Thereafter, the suspension was cooled down to a temperature of 125° C., and 56 g of sodium dodecylbenzenesulfonate were added to the suspension. Thereafter, 14 kg of styrene monomer with 63 g of dicumyl peroxide as a polymerization initiator dissolved therein were added dropwise for 270 minutes. Then, 4 kg of pure water with 315 g of ethylenebisstearic acid amide, 20 g of magnesium pyrophosphate and 4.0 g of sodium dodecylbenzenesulfonate dispersed therein were added dropwise for 30 minutes. After completion of dropwise addition, the mixture was held at 125° C. for an hour, then heated to 140° C., and held at this temperature for 3 hours to complete polymerization. Thereafter, the resulting product was cooled to ordinary temperature, and polypropylene-modified styrene-based resin particles (average particle diameter: 1.37 mm) were extracted.

The styrene monomer was used in an amount of 150 parts by weight based on 100 parts by weight of polypropylene resin particles.

b) Adjustment of Amount of Internal Moisture

Polypropylene-modified styrene-based resin particles obtained as described above were dewatered by a basket-type centrifugal separator, and dewatered polypropylene-modified styrene-based resin particles were dried by passing air for 45 minutes in a cylindrical dryer at ordinary temperature. Polypropylene-modified styrene-based resin particles thus obtained had an internal moisture amount of 0.223% by weight.

c) Impregnation with Blowing Agent (Wet Impregnation Method)

2 kg of polypropylene-modified styrene-based resin particles obtained as described above were placed in a 5 L of autoclave with a stirrer. Thereafter, 2 kg of pure water, 2 g of sodium dodecylbenzenesulfonate and 0.6 g of polyoxyethylene laurylamine were added as an aqueous medium, the mixture was stirred to suspend the particles in the aqueous medium, and the suspension was held for 10 minutes, and then heated to 60° C. Then, 340 g of pentane containing 97% or more of i-pentane (gas type a: trade name: ISOPENTANE manufactured by SK Corporation) were added. Thereafter, the mixture was continuously stirred at this temperature for 3 hours. Thereafter, the mixture was cooled to ordinary temperature, and particles were extracted.

d) Adjustment of Amount of Surface-Attached Moisture

Expandable composite resin particles obtained as described above were dewatered for a minute by a basket-type centrifugal separator to adjust the amount of surface-attached moisture to values shown in Table 1 (the amount of internal moisture of expandable composite resin particles was adjusted at the same time). 0.05% by weight of polyethylene glycol having a weight average molecular weight of 300 (trade name: PEG#300 manufactured by NOF CORPORATION) were added to expandable composite resin particles, and the resulting product was uniformly mixed.

Expandable composite resin particles were stored under an environment of room temperature: 25° C. and humidity: 50%, and a change in expanding capability over time was evaluated. Evaluation results are shown in Table 2.

e) Storage

About 1,000 g of expandable composite resin particles were filled in a 2 L aluminum airtight container, and stored for 168 hours in a freezer set at −25° C.

Frozen and stored expandable composite resin particles were unsealed, and evaluated by the aforementioned method for evaluating a frozen state. Evaluation results are shown in Table 2.

f) Pre-Expansion

After being stored in the manner described above, expandable composite resin particles were left standing under an environment of room temperature: 25° C. and humidity: 50% for an hour with the particles filled in a 2 L aluminum airtight container, and the expandable composite resin particles were pre-expanded under the following pre-expansion conditions with a bulk expansion ratio of 40 being targeted, whereby pre-expanded particles having a bulk expansion ratio of 40 were obtained.

Specifically, pre-expanded particles were obtained by expansion under a high pressure as described below. That is, 500 to 1,000 g of expandable composite resin particles were charged in a high-pressure pre-expanding machine (PSX40 manufactured by KASAHARA Industry Co., Ltd.; internal volume: 45 L) pre-heated by steam. Steam was introduced up to a setting of about 0.05 MPa of gauge pressure while stirring the charged particles, so that the particles were expanded to a predetermined bulk density (bulk expansion ratio) in about 2 to 3 minutes to obtain pre-expanded particles.

Various evaluation results are shown in Table 2.

Example 12 a) Production of Polypropylene-Modified Styrene-Based Resin Particles of Polypropylene-Based Resin (PP)/Polystyrene-Based Resin (PS)=30/70

Polypropylene resin particles (trade name: F-744NP manufactured by Prime Polymer Co., Ltd.) were heated and mixed in an extruder and pelletized by an underwater cutting method (polypropylene resin particles were adjusted to 60 mg per 100 particles). 10.5 kg of the polypropylene resin particles were placed in a 100 L autoclave with a stirrer. Thereafter, 41 kg of pure water, 400 g of magnesium pyrophosphate and 4.0 g of sodium dodecylbenzenesulfonate were added as an aqueous medium, the mixture was stirred to suspend the particles in the aqueous medium, and the suspension was held for 10 minutes, and then heated to 60° C.

Then, 5.0 kg of styrene monomer with 10 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 140° C., and continuously stirred at this temperature for 2 hours. Thereafter, the suspension was cooled down to a temperature of 125° C., and 56 g of sodium dodecylbenzenesulfonate were added to the suspension. Thereafter, 19.5 kg of styrene monomer with 73.5 g of dicumyl peroxide as a polymerization initiator dissolved therein were added dropwise for 6 hours. 4 kg of pure water with 350 g of ethylenebisstearic acid amide, 20 g of magnesium pyrophosphate and 4.0 g of sodium dodecylbenzenesulfonate dispersed therein were added dropwise for 30 minutes. After completion of dropwise addition, the mixture was held at 125° C. for an hour, then heated to 140° C., and held at this temperature for 3 hours to complete polymerization. Thereafter, the resulting product was cooled to ordinary temperature, and polypropylene-modified styrene-based resin particles (average particle diameter: 1.41 mm) were extracted.

The styrene monomer was used in an amount of 233 parts by weight based on 100 parts by weight of polypropylene resin particles.

An amount of internal moisture was adjusted in the same manner as in b) of Example 11 except that the particles were dried by passing air for 30 minutes. Polypropylene-modified styrene-based resin particles thus obtained had an internal moisture amount of 0.370% by weight. Impregnation with a blowing agent was performed in the same manner as in c) of Example 11 except that a temperature of the aqueous medium was 50° C. and 340 g of pentane containing 97% or more of i-pentane (gas type a: trade name: ISOPENTANE manufactured by SK Corporation) were used, and adjustment of an amount of surface-attached moisture and storage and pre-expansion of expandable composite resin particles were performed in the same manner as in d), e) and f) of Example 11.

Various evaluation results are shown in Table 2.

Example 13 a) Production of Carbon-Containing Polypropylene-Modified Styrene-based Resin Particles of Carbon-containing Polypropylene-based Resin (PP)/Polystyrene-based Resin (PS)=40/60

26.7 kg of polypropylene resin particles (trade name: F-744NP manufactured by Prime Polymer Co., Ltd.) and a master batch containing 45% by weight of furnace black (trade name: "PP-RM 10H381" manufactured by Dainichiseika Color 86 Chemicals Mfg. Co., Ltd.) were mixed, and the mixture was heated and mixed in an extruder and pelletized by an underwater cutting method (polypropylene resin particles that contain a carbon (carbon-containing polypropylene resin particles were adjusted to 80 mg per 100 particles)). 14 kg of the carbon-containing polypropylene resin particles were placed in a 100 L autoclave with a stirrer. Thereafter, 41 kg of pure water, 400 g of magnesium pyrophosphate and 4 g of sodium dodecylbenzenesulfonate were added as an aqueous medium, the mixture was stirred to suspend the particles in the aqueous medium, and the suspension was held for 10 minutes, and then heated to 60° C.

Then, 7.0 kg of styrene monomer with 14 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 140° C., and continuously stirred at this temperature for 2 hours. Thereafter, the suspension was cooled down to a temperature of 125° C., and 56 g of sodium dodecylbenzenesulfonate were added to the suspension. Thereafter, 14 kg of styrene monomer with 63 g of dicumyl peroxide as a polymerization initiator dissolved therein were added dropwise for 4 hours. Then, 4 kg of pure water with 280 g of ethylenebisstearic acid amide, 20 g of magnesium pyrophosphate and 4.0 g of sodium dodecylbenzenesulfonate dispersed therein were added dropwise for 30 minutes. After completion of dropwise addition, the mixture was held at 125° C. for an hour, then heated to 140° C., and held at this temperature for 3 hours to complete polymerization. Thereafter, the resulting product was cooled to ordinary temperature, and polypropylene-modified styrene-based resin particles (average particle diameter: 1.48 mm) were extracted.

The styrene monomer was used in an amount of 150 parts by weight based on 100 parts by weight of carbon-containing polypropylene resin particles.

b) Adjustment of Amount of Internal Moisture

Carbon-containing polypropylene-modified styrene-based resin particles obtained as described above were dewatered by a basket-type centrifugal separator, and dewatered carbon-containing polypropylene-modified styrene-based resin particles were dried by passing air for 45 minutes in a cylindrical dryer at ordinary temperature. Carbon-containing polypropylene-modified styrene-based resin particles thus obtained had an internal moisture amount of 0.298% by weight.

c) and d) Impregnation with Blowing Agent (Dry Impregnation) and Adjustment of an Amount Surface-Attached Moisture 15 kg of carbon-containing polypropylene-modified styrene-based resin particles obtained as described above, 4.5 g of polyoxyethylene laurylamine, 7.5 g of polyethylene glycol (PEG#300 manufactured by NOF CORPORATION) and 150 g of pure water were placed in a pressure-resistance rotary mixer having an internal volume of 50 L, rotated, held for 10 minutes, and then heated to 70° C. Then, 2,550 g of pentane containing 97% or more of i-pentane (gas type a: trade name: ISOPENTANE manufactured by SK Corporation) were added while rotating the mixture at this temperature. The mixture was continuously rotated at this temperature for 3 hours to perform impregnation with a blowing agent and adjustment of an amount of surface-attached moisture. Thereafter, the mixture was cooled to ordinary temperature, and particles were extracted.

The expandable composite resin particles were stored under an environment of room temperature: 25° C. and humidity: 50%, and a change in expanding capability over time was evaluated. Evaluation results are shown in Table 2.

Storage of expandable composite resin particles was performed in the same manner as in e) of Example 1. Preexpansion was performed in the same manner as in f) of Example 11.

Various evaluation results are shown in Table 2.

Example 14 a) Production of Polyethylene-Modified Styrene-Based Resin Particles of Polyethylene-based Resin (PE)/Polystyrene-based Resin (PS)=50/50

Ethylene-vinyl acetate copolymer resin particles (LV-115 manufactured by Japan Polyethylene Corporation) were heated and mixed in an extruder and pelletized by an underwater cutting method (ethylene-vinyl acetate copolymer resin particles were adjusted to 130 mg per 100 particles). 15 kg of the ethylene-vinyl acetate copolymer resin particles were placed in a 100 L autoclave with a stirrer. Thereafter, 50 kg of pure water, 270 g of magnesium pyrophosphate and 1.25 g of sodium dodecylbenzenesulfonate were added as an aqueous medium, the mixture was stirred to suspend the particles in the aqueous medium, and the suspension was held for 10 minutes, and then heated to 60° C.

Then, 6.5 kg of styrene monomer with 7.8 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 130° C., and continuously stirred at this temperature for 2 hours. Thereafter, the suspension was cooled down to a temperature of 90° C., and 10.75 g of sodium dodecylbenzenesulfonate were added to the suspension. Thereafter, 2.8 kg of styrene monomer with 30 g of benzoyl peroxide and 3 g of t-butyl peroxybenzoate as polymerization initiators and 135 g of dicumyl peroxide as a crosslinker dissolved therein were added dropwise for an hour. Then, 5.7 kg of styrene monomer with 90 g of ethylenebisstearic acid amide dissolved therein were added dropwise for an hour. After completion of dropwise addition, the mixture was held at 90° C. for an hour, then heated to 143° C., and held at this temperature for 2.5 hours to complete polymerization. Thereafter, the resulting product was cooled to ordinary temperature, and polyethylene-modified styrene-based resin particles (average particle diameter: 1.75 mm) were extracted.

The styrene monomer was used in an amount of 100 parts by weight based on 100 parts by weight of ethylene-vinyl acetate copolymer resin particles.

An amount of internal moisture was adjusted in the same manner as in b) of Example 1 except that the particles were dried by passing air for 60 minutes. Polyethylene-modified styrene-based resin particles thus obtained had an internal moisture amount of 0.273% by weight. Impregnation with a blowing agent was performed in the same manner as in c) of Example 1 except that a temperature of the aqueous medium was 70° C. and 340 g of pentane containing 97% or more of i-pentane (gas type a: trade name: ISOPENTANE manufactured by SK Corporation) were used, and adjustment of an amount of surface-attached moisture and storage and pre-expansion of expandable composite resin particles were performed in the same manner as in d), e) and f) of Example 1.

Various evaluation results are shown in Table 2.

Example 15 a) Production of Polyethylene-Modified Styrene-Based Resin Particles of Polyethylene-based Resin (PE)/Polystyrene-based Resin (PS)=10/90

Linear low-density polyethylene resin particles (NF-444A manufactured by Japan Polyethylene Corporation) were heated and mixed in an extruder and pelletized by an underwater cutting method (linear low-density polyethylene resin particles were adjusted to 40 mg per 100 particles). 3.5 kg of the linear low-density polyethylene resin particles were placed in a 100 L autoclave with a stirrer. Thereafter, 40 kg of pure water, 315 g of magnesium pyrophosphate and 1.6 g of sodium dodecylbenzenesulfonate were added as an aqueous medium, the mixture was stirred to suspend the particles in the aqueous medium, and the suspension was held for 10 minutes, and then heated to 60° C.

Then, 1.5 kg of styrene monomer with 3 g of dicumyl peroxide dissolved therein were added dropwise to the suspension for 30 minutes. After dropwise addition, the mixture was held for 30 minutes, so that polyethylene-based resin particles were caused to absorb the styrene monomer. After absorption, the mixture was heated to 135° C., and continuously stirred at this temperature for 2 hours.

Thereafter, the suspension was cooled down to a temperature of 110° C., and 11.4 g of sodium dodecylbenzenesulfonate were added to the suspension. Thereafter, 30 kg of styrene monomer with 110 g of t-butyl peroxybenzoate as a polymerization initiator dissolved therein were added dropwise for 6 hours. Then, a dispersion liquid of 350 g of ethylenebisstearic acid amide, 3 g of sodium dodecylbenzenesulfonate and 5 kg of pure water were added dropwise for 30 minutes.

After dropwise addition, the mixture was held at 110° C. for an hour, then heated to 140° C., and held for 3 hours to complete polymerization. Thereafter, the resulting product was cooled to ordinary temperature, and polyethylene-modified styrene-based resin particles (average particle diameter: 1.53 mm) were extracted.

The styrene monomer was used in an amount of 900 parts by weight based on 100 parts by weight of linear low-density polyethylene.

An amount of internal moisture was adjusted in the same manner as in b) of Example 1 except that the particles were dried by passing air for 60 minutes. Polyethylene-modified styrene-based resin particles thus obtained had an internal moisture amount of 0.161% by weight. Impregnation with a blowing agent was performed in the same manner as in c) of Example 1 except that a temperature of the aqueous medium was 70° C. and 300 g of pentane containing 97% or more of i-pentane (gas type a: trade name: ISOPENTANE manufactured by SK Corporation) were used, adjustment of an amount of surface-attached moisture was performed in the same manner as in d) of Example 1 except that dewatering time was 5 minutes, and storage and pre-expansion of expandable composite resin particles were performed in the same manner as in e) and f) of Example 1.

Various evaluation results are shown in Table 2.

Example 16

Production of polyethylene-modified styrene-based resin particles and adjustment of an amount of internal moisture were performed in the same manner as in a) and b) of Example 1, impregnation with a blowing agent was performed in the same manner as in c) of Example 1 except that 220 g of pentane containing 97% or more of i-pentane (gas type a: trade name: ISOPENTANE manufactured by SK Corporation) were used, adjustment of an amount of surface-attached moisture, storage and pre-expansion of expandable composite resin particles were performed in the same manner as in d), e) and f) of Example 1.

Various evaluation results are shown in Tables 2 and 4.

Example 17

Production of polyethylene-modified styrene-based resin particles and adjustment of an amount of internal moisture were performed in the same manner as in a) and b) of Example 1, impregnation with a blowing agent was performed in the same manner as in c) of Example 1 except that 300 g of pentane containing 97% or more of i-pentane (gas type a: trade name: ISOPENTANE manufactured by SK Corporation) were used, adjustment of an amount of surface-attached moisture, storage and pre-expansion of expandable composite resin particles were performed in the same manner as in d), e) and f) of Example 1.

Various evaluation results are shown in Tables 2 and 4.

Example 18 a) Production of Polyethylene-modified Styrene-based Resin Particles of Polyethylene-based Resin (PE)/Polystyrene-based Resin (PS)=30/70

Ethylene-vinyl acetate copolymer resin particles (LV-115 manufactured by Japan Polyethylene Corporation) were heated and mixed in an extruder and pelletized by an underwater cutting method (ethylene-vinyl acetate copolymer resin particles were adjusted to 80 mg per 100 particles). 10.5 kg of the ethylene-vinyl acetate copolymer resin particles were placed in a 100 L autoclave with a stirrer. Thereafter, 45 kg of pure water, 315 g of magnesium pyrophosphate and 1.6 g of sodium dodecylbenzenesulfonate were added as an aqueous medium, the mixture was stirred to suspend the particles in the aqueous medium, and the suspension was held for 10 minutes, and then heated to 60° C.

Then, 4.5 kg of styrene monomer with 5.4 g of dicumyl peroxide dissolved therein were added dropwise to the suspension for 30 minutes. After dropwise addition, the mixture was held at 60° C. for 30 minutes, so that polyethylene-based resin particles were caused to absorb the styrene monomer. After absorption, the mixture was heated to 130° C., and continuously stirred at this temperature for 105 minutes. Thereafter, the suspension was cooled down to a temperature of 90° C., and 11.4 g of sodium dodecylbenzenesulfonate were added to the suspension. Thereafter, 6.025 kg of styrene monomer with 175 g of butyl acrylate, 39.2 g of benzoyl peroxide and 4.9 g of t-butyl peroxybenzoate as polymerization initiators and 98.7 g of dicumyl peroxide as a crosslinker dissolved therein were added dropwise for 2 hours. Then, 13.45 kg of styrene monomer with 350 g of butyl acrylate, 175 g of ethylenebisstearic acid amide dissolved therein were added dropwise for 2 hours. After completion of dropwise addition, the mixture was held at 90° C. for an hour, then heated to 143° C., and held at this temperature for 2 hours to complete polymerization. Thereafter, the resulting product was cooled to ordinary temperature, and polyethylene-modified styrene-based resin particles (average particle diameter: 1.60 mm) were extracted.

The styrene-based monomer was used in an amount of 233 parts by weight based on 100 parts by weight of ethylene-vinyl acetate copolymer resin particles.

Adjustment of an amount of internal moisture of polyethylene-modified styrene-based resin particles, impregnation with a blowing agent (wet impregnation method), adjustment of an amount of surface-attached moisture, storage and pre-expansion were performed in the same manner as in b), c), d), e) and f) of Example 1.

Various evaluation results are shown in Table 2.

Example 19 a) Production of Polyethylene-Modified Styrene-Based Resin Particles of Polyethylene-Based Resin (PE)/Polystyrene-Based Resin (PS)=20/80

Linear low-density polyethylene resin particles (NF-444A manufactured by Japan Polyethylene Corporation) were heated and mixed in an extruder and pelletized by an underwater cutting method (linear low-density polyethylene resin particles were adjusted to 40 mg per 100 particles). 7.0 kg of the linear low-density polyethylene resin particles were placed in a 100 L autoclave with a stirrer. Thereafter, 40 kg of pure water, 315 g of magnesium pyrophosphate and 1.6 g of sodium dodecylbenzenesulfonate were added as an aqueous medium, the mixture was stirred to suspend the particles in the aqueous medium, and the suspension was held for 10 minutes, and then heated to 60° C.

Then, 3.5 kg of styrene monomer with 8.75 g of dicumyl peroxide dissolved therein were added dropwise to the suspension for 30 minutes. After dropwise addition, the mixture was held for 30 minutes, so that polyethylene-based resin particles were caused to absorb the styrene monomer. After absorption, the mixture was heated to 135° C., and continuously stirred at this temperature for 2 hours.

Thereafter, the suspension was cooled down to a temperature of 110° C., and 11.4 g of sodium dodecylbenzenesulfonate were added to the suspension. Thereafter, 23.8 kg of styrene monomer with 700 g of butyl acrylate and 98 g of t-butyl peroxybenzoate as a polymerization initiator dissolved therein were added dropwise for 4 hours. Then, a dispersion liquid of 350 g of ethylenebisstearic acid amide, 3 g of sodium dodecylbenzenesulfonate and 5 kg of pure water was added dropwise for 30 minutes.

After dropwise addition, the mixture was held at 110° C. for an hour, then heated to 140° C., and held for 3 hours to complete polymerization. Thereafter, the resulting product was cooled to ordinary temperature, and polyethylene-modified styrene-based resin particles (average particle diameter: 1.32 mm) were extracted.

The styrene-based monomer was used in an amount of 400 parts by weight based on 100 parts by weight of linear low-density polyethylene.

Adjustment of an amount of internal moisture of polyethylene-modified styrene-based resin particles, impregnation with a blowing agent (wet impregnation method), adjustment of an amount of surface-attached moisture, storage and pre-expansion were performed in the same manner as in b), c), d), e) and f) of Example 4.

Various evaluation results are shown in Table 2.

Comparative Example 1

Production of polyethylene-modified styrene-based resin particles and adjustment of an amount of internal moisture were performed in the same manner as in a) and b) of Example 1, impregnation with a blowing agent was performed in the same manner as in c) of Example 1 except that 260 g of pentane containing 97% or more of i-pentane (gas type a: trade name: ISOPENTANE manufactured by SK Corporation) were used, adjustment of an amount of surface-attached moisture was performed in the same manner as in d) of Example 1 except that the particles were dewatered for 5 minutes by a basket-type centrifugal separator, and then dried by passing air for 10 minutes at ordinary temperature in a cylindrical dryer, and storage and pre-expansion of expandable composite resin particles were performed in the same manner as in e) and f) of Example 1.

Various evaluation results are shown in Table 3.

Comparative Example 2

Production of polyethylene-modified styrene-based resin particles and adjustment of an amount of internal moisture were performed in the same manner as in a) and b) of Example 3, impregnation (dry impregnation) with a blowing agent and adjustment of an amount of surface-attached moisture were performed in the same manner as in c) and d) of example 5 except that pure water was not used and that a pressure-resistance rotary mixer was heated to 50° C., and rotated at this temperature while adding 2,250 g of pentane of n-pentane/1-pentane=75/25 to 85/15 (gas type b: trade name: PENTANE manufactured by Cosmo Oil Co., Ltd.), and storage and pre-expansion of expandable composite resin particles were performed in the same manner as in e) and f) of Example 1.

Various evaluation results are shown in Table 3.

Comparative Example 3

Production of polyethylene-modified styrene-based resin particles, adjustment of an amount of internal moisture and impregnation with a blowing agent were performed in the same manner as in a), b) and c) of Example 4. Adjustment of an amount of surface-attached moisture was performed in the same manner as in d) of Example 1 except that the particles were only drained and not dewatered, and storage and pre-expansion of expandable composite resin particles were performed in the same manner as in e) and f) of Example 1.

Various evaluation results are shown in Table 3.

Comparative Example 4

Production of polyethylene-modified styrene-based resin particles and adjustment of an amount of internal moisture were performed in the same manner as in a) and b) of Example 4, impregnation (dry impregnation) with a blowing agent and adjustment of an amount of surface-attached moisture were performed in the same manner as in c) and d) of example 5 except that pure water was not used, and storage and pre-expansion of expandable composite resin particles were performed in the same manner as in e) and f) of Example 1.

Various evaluation results are shown in Table 3.

Comparative Example 5

Production of polyethylene-modified styrene-based resin particles and adjustment of an amount of internal moisture were performed in the same manner as in a) and b) of Example 4, impregnation with a blowing agent was performed in the same manner as in c) of Example 4 except that butane of n-butane/i-butane=60/40 to 70/30 (gas type c: trade name COSMO BUTANE SILVER manufactured by Cosmo Oil Co., Ltd.), and adjustment of an amount of surface-attached moisture and storage and pre-expansion of expandable composite resin particles were performed in the same manner as in d), e) and f) of Example 1.

Various evaluation results are shown in Table 3.

Comparative Example 6

Production of polyethylene-modified styrene-based resin particles and adjustment of an amount of internal moisture were performed in the same manner as in a) and b) of Example 4, impregnation (dry impregnation) with a blowing agent and adjustment of an amount of surface-attached moisture were performed in the same manner as in c) and d) of example 5 except that 750 g of pure water were used, and storage and pre-expansion of expandable composite resin particles were performed in the same manner as in e) and f) of Example 1.

Various evaluation results are shown in Table 3.

Comparative Example 7

Production of polyethylene-modified styrene-based resin particles and adjustment of an amount of internal moisture were performed in the same manner as in a) and b) of Example 1, impregnation with a blowing agent was performed in the same manner as in c) of Example 1 except that 180 g of pentane containing 97% or more of i-pentane (gas type a: trade name: ISOPENTANE manufactured by SK Corporation) were used, adjustment of an amount of surface-attached moisture, storage and pre-expansion of expandable composite resin particles were performed in the same manner as in d), e) and f) of Example 1.

Various evaluation results are shown in Table 3.

TABLE 1

| | | gas impregnating process | gas type | polyolefin-based gas content | polyolefin-based resin type | content of composite resin particles | polyolefin-based resin/ polystyrene-based resin | \multicolumn{4}{c}{expandable composite resin particles (before freezing)} | | moisturizing agent | |
|---|---|---|---|---|---|---|---|---|---|---|---|---|---|
| | | | | | | | | gas content | total moisture content | internal moisture content | attached moisture content | type | attached content |
| Ex. | 1 | wet | a | 12 | EVA | 0.288 | 30/70 | 8.5 | 1.678 | 0.305 | 1.372 | PEG | 0.043 |
| | 2 | wet | a | 13 | EVA | 0.288 | 30/70 | 9.0 | 0.926 | 0.317 | 0.609 | PEG | 0.042 |
| | 3 | wet | a | 14 | EVA | 0.381 | 40/60 | 9.6 | 1.541 | 0.395 | 1.146 | PEG | 0.040 |
| | 4 | wet | a | 12 | LLDPE | 0.178 | 20/80 | 8.9 | 1.069 | 0.228 | 0.841 | PEG | 0.043 |
| | 5 | dry | a | 12 | LLDPE | 0.178 | 20/80 | 8.7 | 0.857 | 0.190 | 0.667 | PEG | 0.041 |
| | 6 | dry | b | 12 | LLDPE | 0.178 | 20/80 | 9.1 | 1.441 | 0.172 | 1.270 | PEG | 0.040 |
| | 7 | dry | b | 12 | LLDPE | 0.178 | 20/80 | 8.9 | 1.321 | 0.131 | 1.190 | — | — |

TABLE 1-continued

| | | | | | | | | | | | | |
|---|---|---|---|---|---|---|---|---|---|---|---|---|
| | 8 | wet | a | 14 | EVA | 0.018 | 30/70 | 10.3 | 1.463 | 0.029 | 1.434 | PEG | 0.044 |
| | 9 | wet | a | 17 | HDPE | 0.486 | 20/80 | 9.1 | 1.399 | 0.440 | 0.959 | PEG | 0.041 |
| | 10 | wet | a | 17 | HDPE | 0.281 | 30/70 | 9.0 | 1.381 | 0.253 | 1.128 | PEG | 0.042 |

| | | expanding property | | | expandable composite resin particles (after freezing) | | | | Evaluation of | Falling Ball |
|---|---|---|---|---|---|---|---|---|---|---|
| | | bulk expansion ratio immediately after impregnation (judgment) | bulk expansion ratio after 3 hours | difference (judgment) | gas content | total moisture content | internal moisture content | attached moisture content | Frozen State (g) (judgment) | Impact Value (cm) |
| | heating hour | | | | | | | | | |
| Ex. 1 | 2 | 70.0 (○) | 65.0 | 5.0 (◎) | 8.5 | 1.675 | 0.304 | 1.371 | 21.3 (○) | 30.5 |
| 2 | 2 | 67.5 (○) | 57.5 | 10.0 (○) | 9.0 | 0.921 | 0.316 | 0.605 | 0 (◎) | — |
| 3 | 2 | 42.5 (○) | 35.0 | 7.5 (◎) | 9.5 | 1.535 | 0.393 | 1.142 | 0 (◎) | 41.5 |
| 4 | 3 | 50.0 (○) | 42.5 | 7.5 (◎) | 8.8 | 1.065 | 0.227 | 0.838 | 0 (◎) | 59.5 |
| 5 | 3 | 52.5 (○) | 42.5 | 10.0 (○) | 8.7 | 0.853 | 0.188 | 0.665 | 0 (◎) | — |
| 6 | 3 | 52.5 (○) | 47.5 | 5.0 (◎) | 9.0 | 1.435 | 0.169 | 1.266 | 8.3 (○) | — |
| 7 | 3 | 52.5 (○) | 42.5 | 10.0 (○) | 8.8 | 1.316 | 0.130 | 1.186 | 0 (◎) | — |
| 8 | 2 | 72.5 (○) | 65.0 | 7.5 (◎) | 10.3 | 1.458 | 0.028 | 1.430 | 38.5 (○) | — |
| 9 | 3 | 67.5 (○) | 62.5 | 5.0 (◎) | 9.1 | 1.395 | 0.438 | 0.957 | 0 (◎) | 29.5 |
| 10 | 3 | 57.5 (○) | 52.5 | 5.0 (◎) | 8.9 | 1.375 | 0.252 | 1.123 | 0 (◎) | 31.5 |

TABLE 2

| | | gas impregnating process | gas type | charge gas content | polyolefin-based resin type | internal moisture content of composite resin particles | polyolefin-based resin/ polystyrene-based resin | expandable composite resin particles (before freezing) | | | | moisturizing agent | |
|---|---|---|---|---|---|---|---|---|---|---|---|---|---|
| | | | | | | | | gas content | total moisture content | internal moisture content | attached moisture content | type | attached content |
| Ex. | 11 | wet | a | 17 | PP | 0.223 | 40/60 | 9.5 | 1.503 | 0.243 | 1.260 | PEG | 0.040 |
| | 12 | wet | a | 17 | PP | 0.370 | 30/70 | 9.8 | 1.561 | 0.381 | 1.180 | PEG | 0.041 |
| | 13 | dry | a | 17 | PP | 0.298 | 40/60 | 9.5 | 0.998 | 0.279 | 0.719 | PEG | 0.043 |
| | 14 | wet | a | 17 | EVA | 0.273 | 50/50 | 10.7 | 1.734 | 0.289 | 1.445 | PEG | 0.040 |
| | 15 | wet | a | 15 | LLDPE | 0.161 | 10/90 | 9.8 | 1.052 | 0.163 | 0.889 | PEG | 0.041 |
| | 16 | wet | a | 11 | EVA | 0.288 | 30/70 | 7.7 | 1.604 | 0.291 | 1.313 | PEG | 0.042 |
| | 17 | wet | a | 15 | EVA | 0.288 | 30/70 | 10.8 | 1.631 | 0.306 | 1.325 | PEG | 0.043 |
| | 18 | wet | a | 12 | EVA | 0.291 | 30/70 | 8.6 | 1.733 | 0.333 | 1.400 | PEG | 0.043 |
| | 19 | wet | a | 12 | LLDPE | 0.183 | 20/80 | 8.8 | 1.101 | 0.236 | 0.865 | PEG | 0.042 |

| | | expanding property | | | expandable composite resin particles (after freezing) | | | | Evaluation of | Falling Ball |
|---|---|---|---|---|---|---|---|---|---|---|
| | heating hour | bulk expansion ratio immediately after impregnation (judgment) | bulk expansion ratio after 3 hours | difference (judgment) | gas content | total moisture content | internal moisture content | attached moisture content | Frozen State (g) (judgment) | Impact Value (cm) |
| Ex. 11 | 2 | 55.0 (○) | 47.5 | 7.5 (◎) | 9.4 | 1.497 | 0.241 | 1.256 | 8.5 (○) | 30.5 |
| 12 | 2 | 72.5 (○) | 65.0 | 7.5 (◎) | 9.8 | 1.555 | 0.380 | 1.175 | 0 (◎) | 25.5 |
| 13 | 2 | 55.0 (○) | 47.5 | 7.5 (◎) | 9.4 | 0.995 | 0.278 | 0.717 | 0 (◎) | 31.5 |
| 14 | 3 | 50.0 (○) | 40.0 | 10.0 (○) | 10.6 | 1.730 | 0.288 | 1.442 | 40.1 (○) | 56.5 |
| 15 | 3 | 72.5 (○) | 67.5 | 5.0 (◎) | 9.8 | 1.048 | 0.161 | 0.887 | 0 (◎) | 16.5 |
| 16 | 2 | 52.5 (○) | 45.0 | 7.5 (◎) | 7.6 | 1.599 | 0.290 | 1.309 | 23.8 (○) | — |
| 17 | 2 | 75.0 (○) | 70.0 | 5.0 (◎) | 10.8 | 1.628 | 0.303 | 1.325 | 27.7 (○) | — |
| 18 | 2 | 75.0 (○) | 70.0 | 5.0 (◎) | 8.5 | 1.728 | 0.330 | 1.398 | 25.6 (○) | — |
| 19 | 3 | 55.0 (○) | 50.0 | 5.0 (◎) | 8.7 | 1.095 | 0.233 | 0.862 | 0 (◎) | — |

TABLE 3

| | | gas impregnating process | gas type | charge gas content | polyolefin-based resin type | internal moisture content of composite resin particles | polyolefin-based resin/ polystyrene-based resin | expandable composite resin particles (before freezing) | | | | moisturizing agent | |
|---|---|---|---|---|---|---|---|---|---|---|---|---|---|
| | | | | | | | | gas content | total moisture content | internal moisture content | attached moisture content | type | attached content |
| Com. Ex. | 1 | wet | a | 13 | EVA | 0.288 | 30/70 | 9.3 | 0.586 | 0.275 | 0.311 | PEG | 0.043 |
| | 2 | dry | b | 15 | EVA | 0.381 | 40/60 | 10.1 | 0.376 | 0.367 | 0.009 | PEG | 0.044 |
| | 3 | wet | a | 12 | LLDPE | 0.178 | 20/80 | 8.6 | 3.019 | 0.204 | 2.815 | PEG | 0.040 |
| | 4 | dry | a | 12 | LLDPE | 0.178 | 20/80 | 9.5 | 0.188 | 0.185 | 0.003 | PEG | 0.041 |
| | 5 | wet | c | 12 | LLDPE | 0.178 | 20/80 | 8.8 | 1.514 | 0.181 | 1.333 | PEG | 0.040 |
| | 6 | dry | a | 12 | LLDPE | 0.178 | 20/80 | 9.0 | 2.135 | 0.133 | 2.002 | PEG | 0.042 |
| | 7 | wet | a | 9 | EVA | 0.288 | 30/70 | 6.5 | 1.609 | 0.298 | 1.311 | PEG | 0.043 |

| | | expanding property | | | | expandable composite resin particles (after freezing) | | | | Evaluation of Frozen State (g) (judgment) | Falling Ball Impact Value (cm) |
|---|---|---|---|---|---|---|---|---|---|---|---|
| | | heating hour | bulk expansion ratio immediately after impregnation (judgment) | bulk expansion ratio after 3 hours | difference (judgment) | gas content | total moisture content | internal moisture content | attached moisture content | | |
| Com. Ex. | 1 | 2 | 70.0 (○) | 55.0 | 15.0 (X) | 9.3 | 0.580 | 0.273 | 0.307 | 0 (◎) | — |
| | 2 | 2 | 45.0 (○) | 20.0 | 25.0 (X) | 10.1 | 0.373 | 0.366 | 0.007 | 0 (◎) | — |
| | 3 | 3 | 55.0 (○) | 50.0 | 5.0 (◎) | 8.6 | 3.013 | 0.203 | 2.810 | 353.7 (X) | — |
| | 4 | 3 | 55.0 (○) | 35.0 | 20.0 (X) | 9.5 | 0.185 | 0.183 | 0.002 | 0 (◎) | — |
| | 5 | 3 | 60.0 (○) | 30.0 | 30.0 (X) | 8.7 | 1.509 | 0.180 | 1.329 | 25.8 (○) | — |
| | 6 | 3 | 50.0 (○) | 45.0 | 5.0 (◎) | 9.0 | 2.130 | 0.132 | 1.998 | 128.8 (X) | — |
| | 7 | 2 | 35.0 (X) | 27.5 | 7.5 (◎) | 6.5 | 1.606 | 0.297 | 1.309 | 15.3 (○) | — |

In Tables, gas type a is ISOPENTANE (trade name) (i-pentane: 97% or more) manufactured by SK Corporation, gas type b is PENTANE (trade name) (n-pentane/1-pentane=75/25 to 85/15) manufactured by Cosmo Oil Co., Ltd., and gas type c is COSMO BUTANE SILVER (trade name) (n-butane/i-butane=60/40 to 70/30) manufactured by Cosmo Oil Co., Ltd.

In addition, a unit of an amount of charged gas is wt %/resin particle, a unit of a gas content is wt %, units of amounts of various kinds of moistures are wt %, a unit of an amount of attached moisturizing agent is wt %, a unit of heating time is a minute, and units of a bulk expansion ratio and a difference between bulk expansion ratios in multiple are a time.

TABLE 4

| | | expansion ratio of pre-expanded particles (time) | average cell diameter (mm) | standard deviation of cell diameter (s) | unevenness of cell (U = s/D) |
|---|---|---|---|---|---|
| Ex. | 1 | 50 | 0.35 | 0.15 | 0.43 |
| | 8 | 50 | 0.74 | 0.84 | 1.14 |
| | 16 | 50 | 0.27 | 0.16 | 0.59 |
| | 17 | 50 | 0.80 | 0.58 | 0.73 |

It is apparent from Examples 1 to 19, Comparative Examples 1 to 4 and Comparative Examples 6 and 7 that quality of expandable composite resin particles having a surface-attached moisture amount of 0.5 to 1.5% by weight and a blowing agent content of 7.5 to 11.0% by weight is hardly changed even 3 hours after they are frozen and stored.

Further, it is apparent from Examples 1 to 19 and Comparative Example 5 that pentane is superior to butane as a blowing agent.

In addition, as shown in Table 4, it is apparent from Examples 1, 8, 16 and 17 that if the amount of internal moisture is in a range of 0.05 to 0.5% by weight, cell unevenness can be further suppressed.

What is claimed is:

1. Expandable composite resin particles for frozen storage comprising: composite resin particles of a polyolefin-based resin and a polystyrene-based resin; 7.5 to 11% by weight of volatile blowing agent contained in the composite resin particles and containing pentane; and 0.5 to 1.5% by weight of moisture attached to surfaces of the composite resin particles, wherein the expandable composite resin particles for frozen storage further contain 0.05 to 0.5% by weight of internal moisture.

2. The expandable composite resin particles for frozen storage of claim 1, wherein the composite resin particles are particles containing 100 parts by weight of polyethylene-based resin or polypropylene-based resin as a polyolefin-based resin and 110 to 900 parts by weight of polystyrene-based resin.

3. The expandable composite resin particles for frozen storage of claim 1, wherein the composite resin particles are particles containing 100 parts by weight of polyethylene-based resin or polypropylene-based resin as a polyolefin-based resin and 110 to 730 parts by weight of polystyrene-based resin.

4. The expandable composite resin particles for frozen storage of claim 1, wherein the volatile blowing agent is pentane, and the pentane is contained in an amount of 8.5 to 10.0% by weight.

5. The expandable composite resin particles for frozen storage of claim 1, wherein the expandable composite resin particles for frozen storage further contain 0.01 to 0.1% by weight of moisturizing agent attached to surfaces thereof.

6. The expandable composite resin particles for frozen storage of claim 5, wherein the moisturizing agent is a polyethylene glycol having a weight average molecular weight of 100 to 600.

7. Expanded molded article obtained by pre-expanding the expandable composite resin particles for frozen storage of claim 1 and then molding the pre-expanded particles in a mold.

8. A method for producing the expandable composite resin particles for frozen storage of claim 1, comprising steps of: impregnating composite resin particles with a volatile blowing agent containing pentane; and moisturizing or dewatering the composite resin particles after impregnation to adjust an amount of attached moisture on surfaces.

9. A method for storing expandable composite resin particles for frozen storage, comprising a step of storing the expandable composite resin particles for frozen storage of claim 1 in a container set at −5° C. or lower until the particles are subjected to a pre-expansion step.

10. The expandable composite resin particles for frozen storage according to claim 1, comprising 0.6 to 1.5% by weight of moisture attached to surfaces of the composite resin particles, and 0.05 to 0.5% by weight of internal moisture.

11. The expandable composite resin particles for frozen storage according to claim 10, comprising 0.6 to 1.5% by weight of moisture attached to surfaces of the composite resin particles, and 0.05 to 0.45% by weight of internal moisture.

* * * * *